(12) United States Patent
Rico Alvarino et al.

(10) Patent No.: US 12,720,529 B2
(45) Date of Patent: Aug. 25, 2026

(54) PEAK DATA RATE CALCULATION FOR UPLINK TRANSMIT SWITCHING

(71) Applicant: QUALCOMM Incorporated, San Diego, CA (US)

(72) Inventors: Alberto Rico Alvarino, San Diego, CA (US); Peter Gaal, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 768 days.

(21) Appl. No.: 18/003,889

(22) PCT Filed: Aug. 25, 2021

(86) PCT No.: PCT/US2021/047594
§ 371 (c)(1),
(2) Date: Dec. 29, 2022

(87) PCT Pub. No.: WO2022/046933
PCT Pub. Date: Mar. 3, 2022

(65) Prior Publication Data

US 2023/0254848 A1 Aug. 10, 2023

(30) Foreign Application Priority Data

Aug. 25, 2020 (GR) .............................. 20200100514

(51) Int. Cl.
*H04W 72/1268* (2023.01)
*H04L 5/00* (2006.01)

(52) U.S. Cl.
CPC ....... *H04W 72/1268* (2013.01); *H04L 5/0064* (2013.01)

(58) Field of Classification Search
None
See application file for complete search history.

(56) References Cited

U.S. PATENT DOCUMENTS 8,340,661 B2 * 12/2012 Boixadera ......... H04W 36/1443 455/552.1
2012/0213154 A1 8/2012 Gaal et al.
(Continued)

FOREIGN PATENT DOCUMENTS

CN 101312551 A 11/2008
EP 2538718 A1 12/2012
(Continued)

OTHER PUBLICATIONS

International Search Report and Written Opinion—PCT/US2021/047594—ISA/EPO—Dec. 22, 2021.

*Primary Examiner* — Phirin Sam
(74) *Attorney, Agent, or Firm* — Loza & Loza, LLP

(57) ABSTRACT

Aspects relate to a peak data rate for an uplink transmission. A user equipment may be scheduled for an uplink transmission on at least one radio frequency carrier of a plurality of radio frequency carriers. The user equipment may transmit the uplink transmission on the at least one radio frequency carrier according to a peak uplink data rate for a time slot. In some aspects, the user equipment may calculate the peak uplink data rate based on whether the user equipment supports uplink switching between the plurality of radio frequency carriers.

30 Claims, 17 Drawing Sheets

(56) References Cited

U.S. PATENT DOCUMENTS

| | | | | |
|---|---|---|---|---|
| 2014/0313993 | A1* | 10/2014 | Tabet | H04W 72/23<br>370/329 |
| 2017/0303182 | A1 | 10/2017 | Uchino et al. | |
| 2018/0270799 | A1* | 9/2018 | Noh | H04L 27/261 |
| 2019/0021045 | A1* | 1/2019 | Kim | H04W 72/23 |
| 2020/0367289 | A1* | 11/2020 | Choi | H04W 74/006 |
| 2021/0328733 | A1* | 10/2021 | Zhang | H04L 5/0037 |
| 2023/0023719 | A1* | 1/2023 | Ji | H04W 72/21 |
| 2024/0251396 | A1* | 7/2024 | Choi | H04W 72/23 |

FOREIGN PATENT DOCUMENTS

| | | | |
|---|---|---|---|
| WO | 2020027710 | A1 | 2/2020 |
| WO | 2020140877 | A1 | 7/2020 |

* cited by examiner

700

| Configuration 1 | | |
|---|---|---|
| | Number of Tx chains in WID (carrier 1 + carrier 2) | Number of of antenna ports for UL transmission (carrier 1 + carrier 2) |
| Case 1 | 1T + 1T | 1P + 0P |
| Case 2 | 0T + 2T | 0P + 2P, 0P + 1P |

| Configuration 2 | | |
|---|---|---|
| | Number of Tx chains in WID (carrier 1 + carrier 2) | Number of of antenna ports for UL transmission (carrier 1 + carrier 2) |
| Case 1 | 1T + 1T | 1P + 0P, 1P + 1P, 0P + 1P |
| Case 2 | 0T + 2T | 0P + 2P, 0P + 1P |

FIG. 7

PEAK DATA RATE CALCULATION FOR UPLINK TRANSMIT SWITCHING

CROSS-REFERENCE TO RELATED APPLICATIONS

This application is the U.S. national stage of PCT patent application number PCT/US2021/047594 filed on Aug. 25, 2021, which claims priority to and the benefit of pending Greece Patent Application Serial No. 20200100514, titled "PEAK DATA RATE CALCULATION FOR UPLINK TRANSMIT SWITCHING" filed Aug. 25, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to calculating a peak data rate for an uplink transmission in conjunction with uplink transmit switching.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. Some UEs include multiple radio frequency (RF) chains that enable the UE to concurrently transmit and/or receive multiple signal streams. A base station may schedule such a UE to communicate on one or more radio frequency (RF) carriers at a given time. For example, a base station may schedule a UE for carrier aggregation where the UE communicates with the base station on multiple RF bands simultaneously.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving scheduling information for a transmission on at least one radio frequency carrier of a plurality of radio frequency carriers, and transmitting the transmission on the at least one radio frequency carrier according to a peak uplink data rate for a time slot. In some aspects, the peak uplink data rate may be based on whether the user equipment supports uplink switching between the plurality of radio frequency carriers.

In some examples, a user equipment may include a transceiver, a memory, and a processor coupled to the transceiver and the memory. The processor and the memory may be configured to receive via the transceiver scheduling information for a transmission on at least one radio frequency carrier of a plurality of radio frequency carriers, and transmit the transmission via the transceiver on the at least one radio frequency carrier according to a peak uplink data rate for a time slot. In some aspects, the peak uplink data rate may be based on whether the user equipment supports uplink switching between the plurality of radio frequency carriers.

In some examples, a user equipment may include means for receiving scheduling information for a transmission on at least one radio frequency carrier of a plurality of radio frequency carriers, and means for transmitting the transmission on the at least one radio frequency carrier according to a peak uplink data rate for a time slot. In some aspects, the peak uplink data rate may be based on whether the user equipment supports uplink switching between the plurality of radio frequency carriers.

In some examples, an article of manufacture for use by a user equipment includes a non-transitory computer-readable medium having stored therein instructions executable by one or more processors of the user equipment to receive scheduling information for a transmission on at least one radio frequency carrier of a plurality of radio frequency carriers, and transmit the transmission on the at least one radio frequency carrier according to a peak uplink data rate for a time slot. In some aspects, the peak uplink data rate may be based on whether the user equipment supports uplink switching between the plurality of radio frequency carriers.

In some examples, a method for wireless communication at a base station is disclosed. The method may include transmitting scheduling information to a user equipment. In some aspects, the scheduling information may schedule a transmission by the user equipment on at least one radio frequency carrier of a plurality of radio frequency carriers. The method may also include receiving the transmission from the user equipment on the at least one radio frequency carrier according to a peak uplink data rate for a time slot. In some aspects, the peak uplink data rate may be based on whether the user equipment supports uplink switching between the plurality of radio frequency carriers.

In some examples, a base station may include a transceiver, a memory, and a processor coupled to the transceiver and the memory. The processor and the memory may be configured to transmit scheduling information to a user equipment via the transceiver. In some aspects, the scheduling information may schedule a transmission by the user equipment on at least one radio frequency carrier of a plurality of radio frequency carriers. The processor and the memory may also be configured to receive the transmission from the user equipment via the transceiver on the at least one radio frequency carrier according to a peak uplink data rate for a time slot. In some aspects, the peak uplink data rate may be based on whether the user equipment supports uplink switching between the plurality of radio frequency carriers.

In some examples, a base station may include means for transmitting scheduling information to a user equipment. In some aspects, the scheduling information may schedule a transmission by the user equipment on at least one radio frequency carrier of a plurality of radio frequency carriers.

The base station may also include means for receiving the transmission from the user equipment on the at least one radio frequency carrier according to a peak uplink data rate for a time slot. In some aspects, the peak uplink data rate may be based on whether the user equipment supports uplink switching between the plurality of radio frequency carriers.

In some examples, an article of manufacture for use by a base station includes a non-transitory computer-readable medium having stored therein instructions executable by one or more processors of the base station to transmit scheduling information to a user equipment. In some aspects, the scheduling information may schedule a transmission by the user equipment on at least one radio frequency carrier of a plurality of radio frequency carriers. The computer-readable medium may also have stored therein instructions executable by one or more processors of the base station to receive the transmission from the user equipment on the at least one radio frequency carrier according to a peak uplink data rate for a time slot. In some aspects, the peak uplink data rate may be based on whether the user equipment supports uplink switching between the plurality of radio frequency carriers.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 7 is a conceptual illustration of an example of different options for uplink transmit switching according to some aspects.

DETAILED DESCRIPTION

Figure 1:
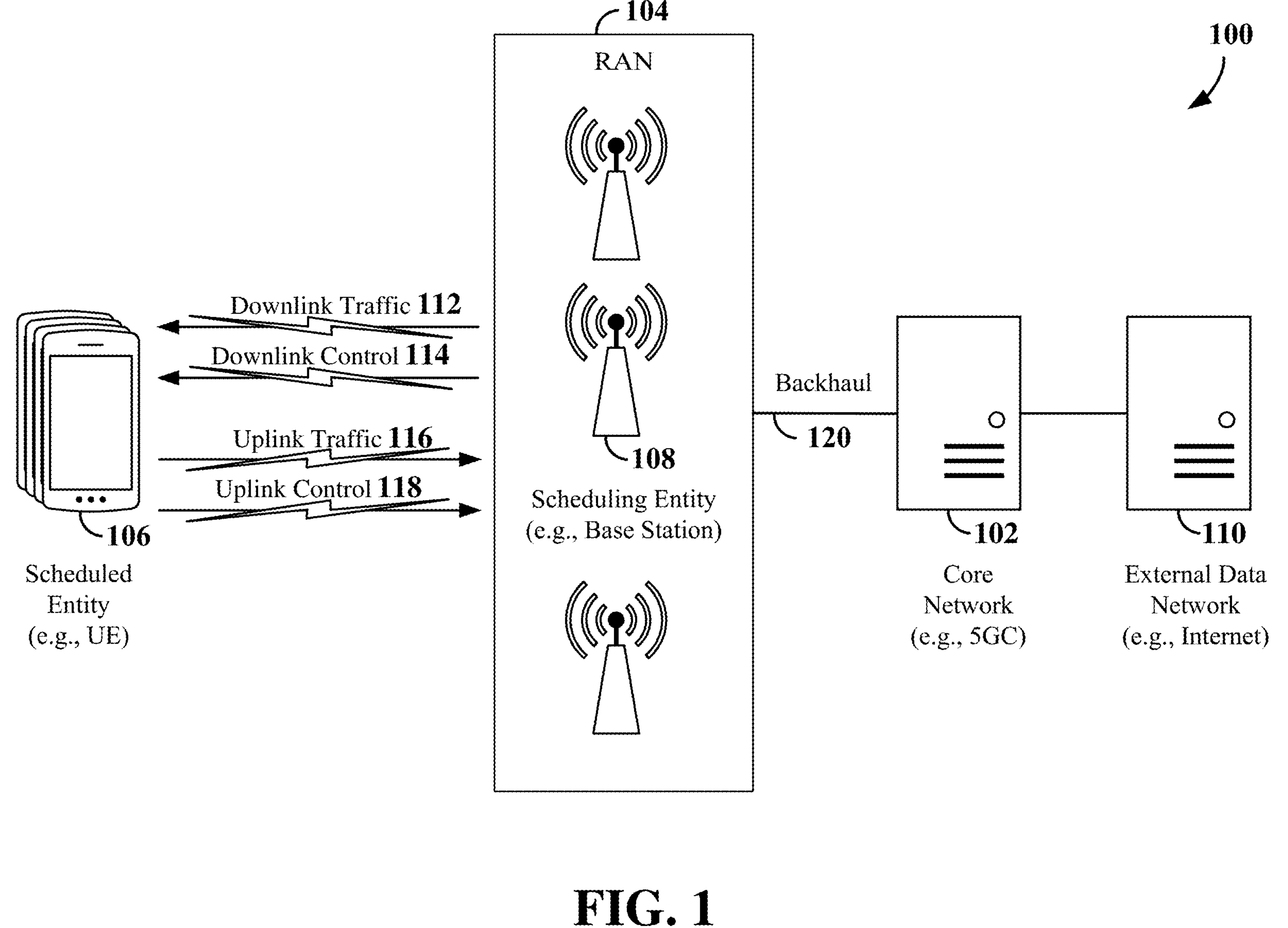
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to uplink carrier switching. In uplink carrier switching, a user equipment (UE) with two or more transmit chains may support different modes of uplink transmission. For example, in a first mode of operation, the UE may support transmission on only a single RF carrier of a set of RF carriers at a given time. In addition, in a second mode of operation transmission, the UE may support either concurrent transmissions on a first RF carrier and a second RF carrier of a set of RF carriers (e.g., using one transmit chain in each RF carrier) or concurrent transmissions on a first RF carrier (e.g., concurrent transmissions within an RF band, using two transmit chains on the first RF carrier) of the set of RF carriers. Other modes of operation for uplink carrier switching are possible.

A user equipment may be scheduled for an uplink transmission on at least one radio frequency carrier of a plurality of radio frequency carriers. The user equipment may transmit the uplink transmission on the at least one radio frequency carrier according to a peak uplink data rate calculated for a time slot. In some examples, the user equipment may calculate the peak uplink data rate based on whether the user equipment supports uplink switching between the plurality of radio frequency carriers.

In some examples where the UE supports transmission on only a single RF carrier of a set of RF carriers at a given time (e.g., the first mode of operation), the UE may determine the peak data rate for each of the RF carriers. The UE may then select the RF carrier with the highest peak data rate for the peak uplink data rate calculation.

In some examples where the UE supports either concurrent transmissions on a first RF carrier and a second RF carrier of a set of RF carriers or concurrent transmissions on a first RF carrier of the set of RF carriers (e.g., the second mode of operation), the UE may determine the peak data rate for each possible combination of the layers supported by the UE across the set of RF carriers. The UE may then select the maximum peak data from these combinations as the peak uplink data rate.

Other combinations of RF carriers may be used in other examples. In some examples, a UE supports a fixed uplink RF carrier along with uplink carrier switching. In this case, the UE may calculate the peak uplink data rate based on a combination of the peak data rate for the RF carriers subject to uplink carrier switching and the peak data rate for the fixed RF carrier. In some examples, a UE supports uplink carrier switching for multiples sets of RF carriers. In this case, the UE may calculate the peak uplink data rate based on a combination of the peak data rates for each of the sets of RF carriers.

A calculation of the peak uplink data rate for a user equipment (UE) may be based on the number of layers on which the UE can concurrently transmit. A UE may support transmission on only a single layer (e.g., a single RF carrier or stream) of a set of layers at a given time, or a UE may support concurrent transmissions on multiple layers.

In some examples, the maximum number of transmit layers supported by a UE may be higher than the number of layers on which the UE can concurrently transmit. In this case, a calculation of the peak uplink data rate for the UE may be based on the number of layers on which the UE can concurrently transmit. The number of layers on which the UE can concurrently transmit may correspond to the number of transmit chains of the UE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or downlink traffic 112 and/or uplink traffic 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 milliseconds) for wireless transmissions, with each frame consisting of, for example, 10 subframes of 1 millisecond (ms) each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
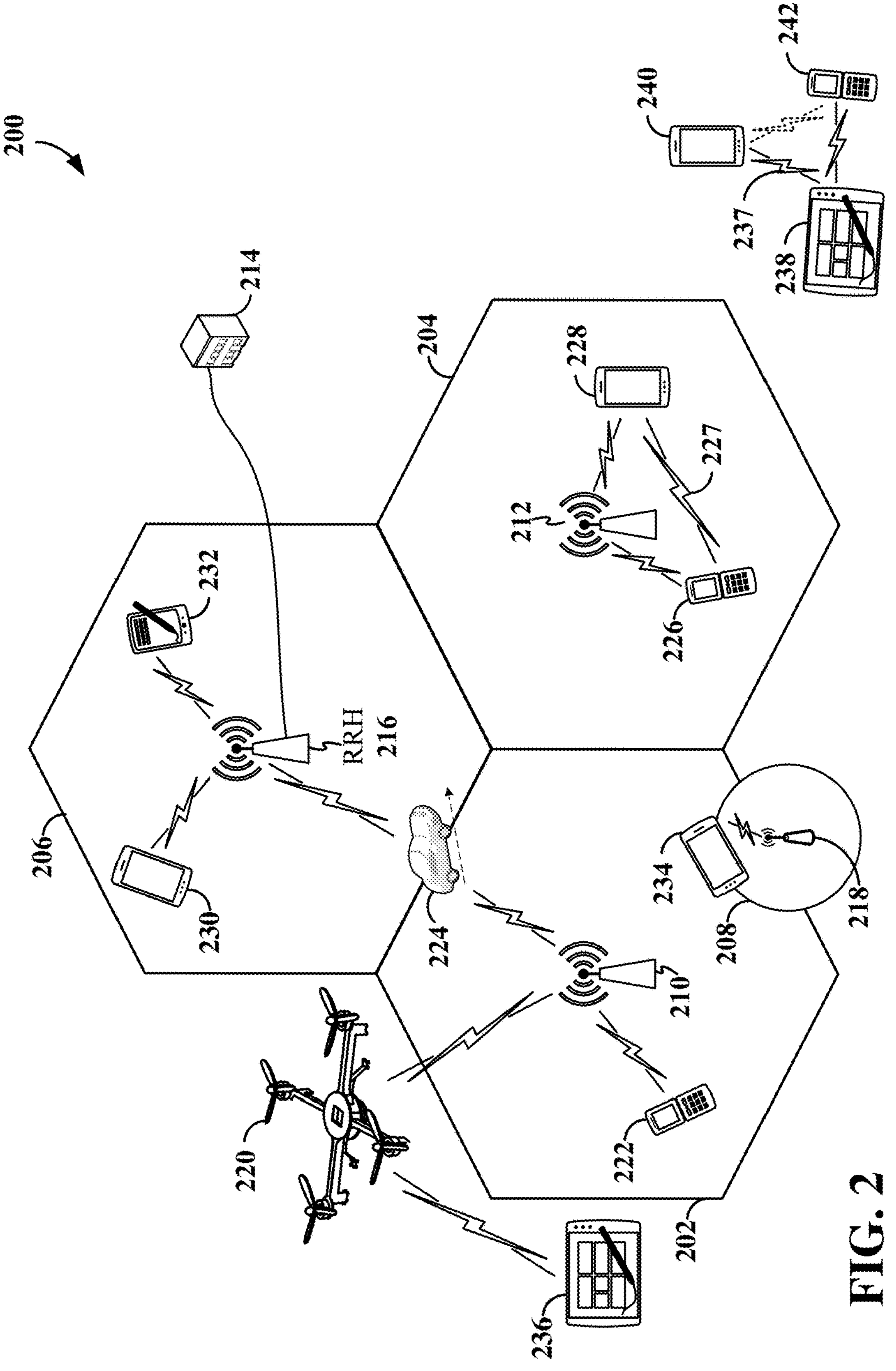
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224.

When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
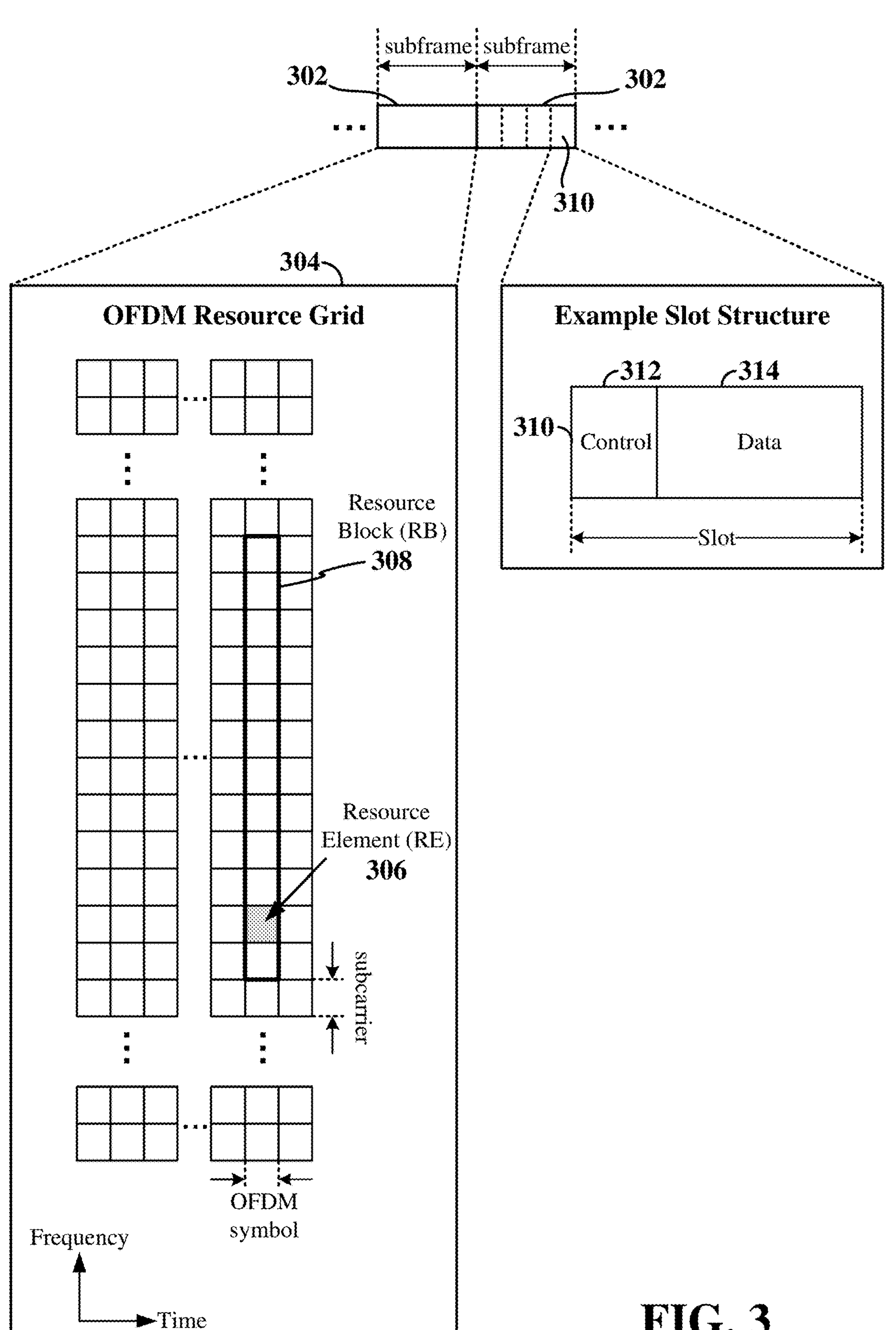
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., receive (Rx) V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

5G-NR networks may support carrier aggregation (CA) of component carriers (CCs) transmitted from different cells and/or different transmission and reception points (TRPs) in a multi-cell transmission environment. The different TRPs may be associated with a single serving cell or multiple serving cells. In some aspects, the term component carrier (CC) may refer to a carrier frequency (or band) utilized for communication within a cell.

Figure 4:
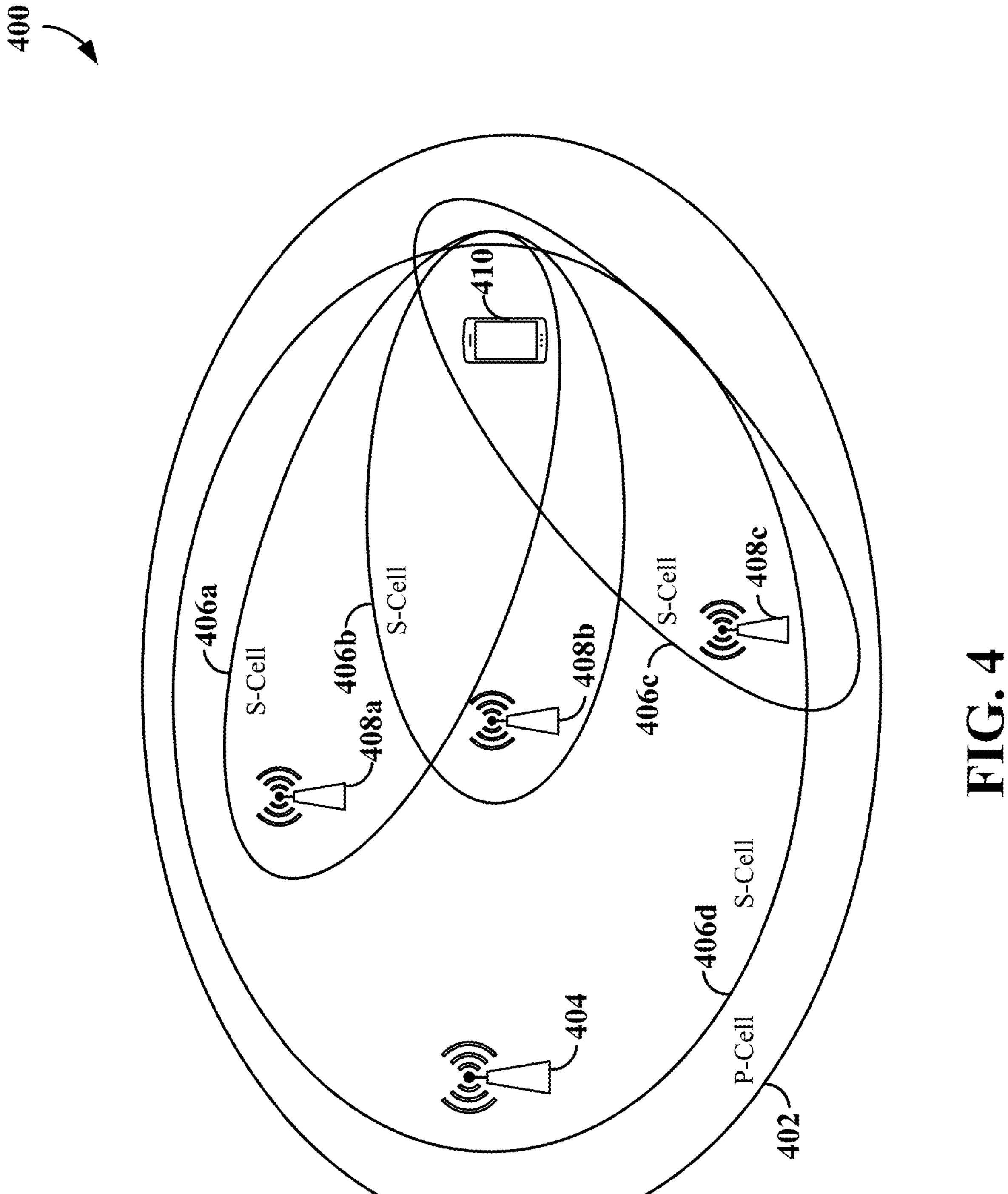
FIG. 4 is a conceptual illustration of a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406*a*, 406*b*, 406*c*, and 406*d*. The PCell 402 may be referred to as the anchor cell that provides a radio resource control (RRC) connection to a UE (e.g., a UE 410).

When carrier aggregation is configured in the multi-cell transmission environment 400, one or more of the SCells 406*a*-406*d* may be activated or added to the PCell 402 to form the serving cells serving the UE 410. In this case, each of the serving cells corresponds to a component carrier (CC). The CC of the PCell 402 may be referred to as a primary CC, and the CC of an SCell 406*a*-406*d* may be referred to as a secondary CC. In some examples, the UE 410 may correspond to any of the UEs or scheduled entities shown in any one or more of FIGS. 1, 2, 4, 5, 11, and 12.

Each of the PCell 402 and the SCells 406*a*-406*d* may be served by a transmission and reception point (TRP). For example, the PCell 402 may be served by a TRP 404 and each of the SCells 406*a*-406*c* may be served by a respective TRP 408*a*-408*c*. Each TRP 404 and 408*a*-408*c* may be a base station (e.g., gNB), remote radio head of a gNB, or other scheduling entity similar to those illustrated in any one or more of FIGS. 1, 2, 4, 5, 11, and 15. In some examples, the PCell 402 and one or more of the SCells (e.g., the SCell 406*d*) may be co-located. For example, a TRP for the PCell 402 and a TRP for the SCell **406*d* may be installed at the same geographic location. Thus, in some examples, a TRP (e.g., the TRP 404) may include multiple TRPs, each corresponding to one of a plurality of co-located antenna arrays, and each supporting a different carrier (different CC). However, the coverage of the PCell 402 and the SCell 406*d*** may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., the SCell **406*a*) for multi-cell communication with the UE 410 to improve the reliability of the connection to the UE 410 and/or to increase the data rate. In some examples, the PCell may activate the SCell 406*a* on an as-needed basis (instead of maintaining the SCell activation when the SCell 406*a* is not utilized for data transmission/reception) to reduce power consumption by the UE 410**.

In some examples, the PCell 402 may be a low band cell, and the SCells 406 may be high band cells. A low band cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In these examples, the multi-cell transmission environment may be referred to as a Multi-RAT-Dual Connectivity (MR-DC) environment. One example of MR-DC is an Evolved-Universal Terrestrial Radio Access Network-New Radio Dual Connectivity (EN-DC) mode that enables a UE to simultaneously connect to an LTE base station and a NR base station to receive data packets from and send data packets to both the LTE base station and the NR base station.

Figure 5:
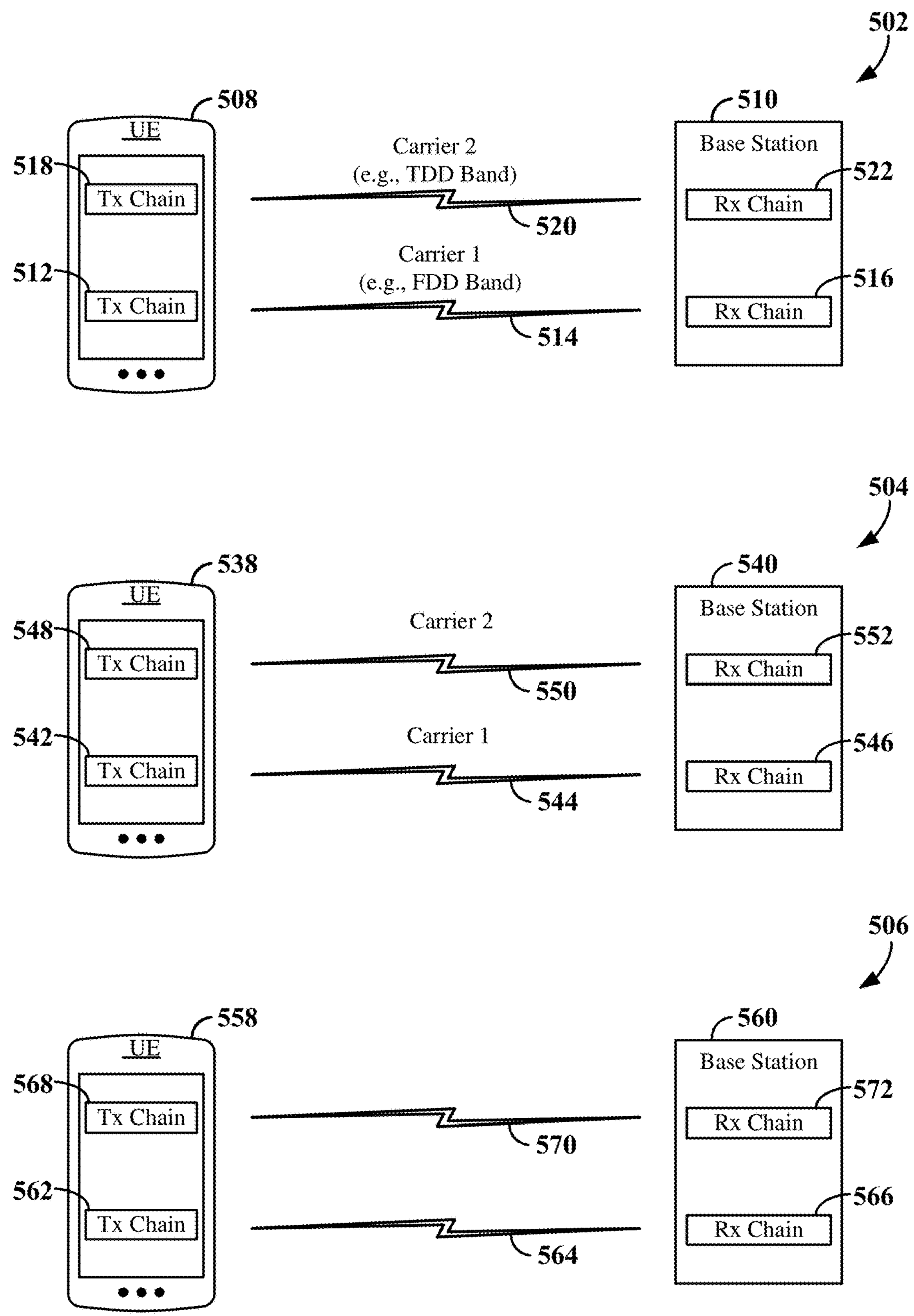
FIG. 5 is a conceptual illustration of an example of user equipment with multiple transmit chains according to some aspects.

FIG. 5 is a conceptual illustration of several examples of wireless communication between UEs and base stations in a first scenario 502, a second scenario 504, and a third scenario 506. In some aspects, the scenarios 502, 504, and 506 may correspond to wireless communication as described above in conjunction with any of FIGS. 1-4.

In each scenario, the UE includes two transmit chains. In some examples, a transmit chain refers to baseband processing (e.g., to generate PUSCH data) and a corresponding power amplifier. With two transmit chains, a UE may transmit two separate uplink streams at the same time. In addition, a transmit chain (e.g., a power amplifier) may be configurable to transmit on different RF bands (e.g., different RF carriers) at different times.

In the first scenario 502, a UE 508 transmits to a base station (BS) 510 using two carriers. In some examples, the UE 508 may correspond to any of the UEs or scheduled entities shown in any of FIGS. 1, 2, 4, 11, and 12. In some examples, the BS 510 may correspond to any of the base stations or scheduling entities shown in any of FIGS. 1, 2, 4, 11, and 15.

For the first scenario 502, a first transmit chain 512 of the UE 508 may transmit a first signal stream 514 to the BS 510 via a first RF carrier (carrier 1). Here, the UE may be configured to route the first signal stream 514 from the first transmit chain 512 to a first antenna (e.g., an antenna array or panel), not shown in FIG. 5. This may be referred to as transmitting the first signal stream 514 via a particular antenna port (or, simply, port). In some examples, the first RF carrier may be designated for FDD communication. A first receive chain 516 of the BS 510 may receive the first signal stream 514.

A second transmit chain 518 of the UE 508 may transmit a second signal stream 520 to the BS 510 via a second RF carrier (carrier 2). Here, the UE may be configured to route the second signal stream 520 from the second transmit chain 518 to a second antenna (e.g., an antenna array or panel), not shown in FIG. 5. This may be referred to as transmitting the second signal stream 520 via a different port. In some examples, the second RF carrier may be designated for TDD communication. A second receive chain 522 of the BS 510 may receive the second signal stream 520.

In some examples, the second RF carrier may occupy a higher frequency band than the second RF carrier. In this case, the second RF carrier may provide wider bandwidth than the first RF carrier and involve the use of more antenna elements than the first RF band. However, the first carrier may provide wider coverage and higher reliability than the first RF carrier.

In the second scenario 504, a UE 538 transmits to a base station (BS) 540 using only one RF carrier at a given point in time (e.g., during a given time slot). In some examples, the UE 538 may correspond to any of the UEs or scheduled entities shown in any of FIGS. 1, 2, 4, 11, and 12. In some examples, the BS 540 may correspond to any of the base stations or scheduling entities shown in any of FIGS. 1, 2, 4, 11, and 15.

For the single RF carrier transmission, a first transmit chain 542 of the UE 538 may transmit a first signal stream 544 to the BS 540 via a first RF carrier (carrier 1) in some examples, and a first receive chain 546 of the BS 510 may receive the first signal stream 544. Also, a second transmit chain 548 of the UE 538 may transmit a second signal stream 550 to the BS 540 via the second RF carrier (carrier 2). In this case, a second receive chain 552 of the BS 540 may receive the second signal stream 550. If the UE 538 only transmits a single signal stream during a time slot, one of the transmit chains may be inactive (e.g., idle) during that time slot. If the UE 538 transmits two signal streams on an RF carrier during a time slot, the UE may be configured to route the first signal stream 544 from the first transmit chain 542 to a first antenna (e.g., an antenna array or panel) and route the second signal stream 550 from the second transmit chain 548 to a second antenna (e.g., an antenna array or panel). This may be referred to as transmitting the signal streams via different antenna ports.

In the third scenario 506, a UE 558 transmits to a base station (BS) 560 using concurrent transmissions on a one RF carrier (e.g., concurrent transmissions within an RF band, using two transmit chains on the RF carrier). In some examples, the UE 558 may correspond to any of the UEs or scheduled entities shown in any of FIGS. 1, 2, 4, 11, and 12. In some examples, the BS 560 may correspond to any of the base stations or scheduling entities shown in any of FIGS. 1, 2, 4, 11, and 15.

For the third scenario 506, a first transmit chain 562 of the UE 508 may transmit a first signal stream 564 to the BS 510 via a first band of a first RF carrier (carrier 1) or a first band of a second RF carrier (carrier 2). Here, the UE may be configured to route the first signal stream 564 from the first transmit chain 562 to a first antenna (e.g., an antenna array or panel). This may be referred to as transmitting the first signal stream 564 via a particular port. A first receive chain 566 of the BS 560 may receive the first signal stream 564.

A second transmit chain 568 of the UE 558 may transmit a second signal stream 570 to the BS 560 via a second band of the RF carrier used to transmit the first signal stream 564. In some examples, the first band and the second band may be referred to as a first carrier and a second carrier, respectively. The UE may be configured to route the second signal stream 570 from the second transmit chain 568 to a second antenna (e.g., an antenna array or panel). This may be referred to as transmitting the second signal stream 570 via a different port. A second receive chain 572 of the BS 510 may receive the second signal stream 570.

In some examples, a UE may be able to switch between different uplink transmission modes of operation. For example, a single UE may support any of the modes of operation described in FIG. 5. In this case, a BS may schedule a UE to transmit on different RF carriers during different time slots. In some cases, this scheduling may result in the UE switching from a first transmission mode to a second transmission mode, or vice versa. This uplink transmit switching may be referred to as SuperLink in some examples.

As one example, network operators may aggregate bands n78 (3.5 GHz) and n1 (2.1 GHz). To enable UL MIMO in band n78 for a UE that has two transmit (Tx) chains, the feature of UL 1 Tx to 2 Tx switching (e.g., switching from transmitting using one transmit (TX) chain to transmitting using two Tx chains, or vice versa) may be used.

In uplink transmit switching, uplink carrier aggregation and uplink MIMO may be supported using two transmit chains. In addition, a single transmit chain mode may be supported (e.g., by configuring a transmit chain to switch from a first component carrier (CC1) to a second component carrier (CC2)).

Figure 6:
FIG. 6 is a conceptual illustration of an example of different transmission modes in a multi-carrier scenario according to some aspects.
Figure 6:
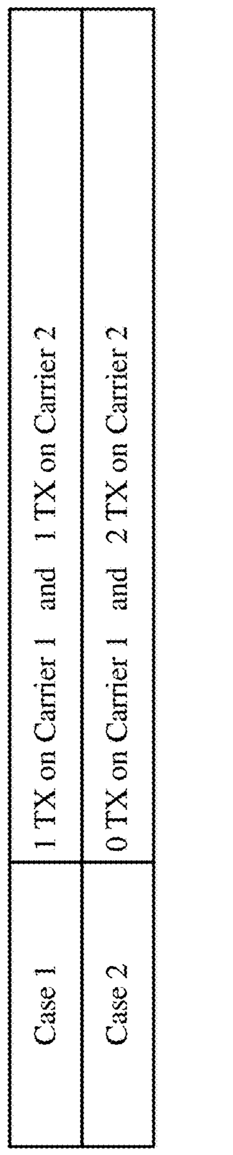
Figure 6:
Figure 6:
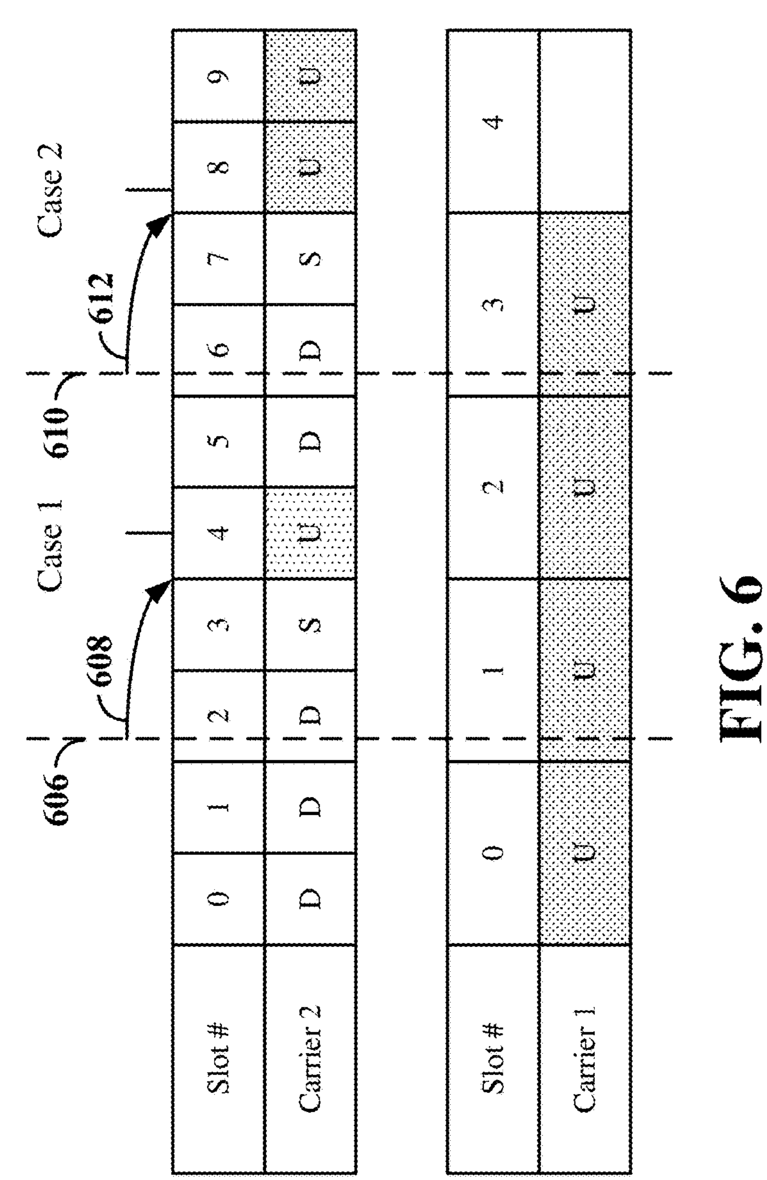

FIG. 6 shows that a UE may use different transmission configurations 602 in an uplink transmit switching scenario. In a first case (case 1), the UE uses a first Tx chain to transmit on carrier 1 (e.g., CC1) and uses a second Tx chain to transmit on carrier 2 (e.g., CC2). In the second case (case 2), the UE uses two Tx chains to transmit on carrier 2 (e.g., CC2) and does not transmit on carrier 1 (e.g., CC1).

FIG. 6 also illustrates an example 604 of two carriers on which a BS and a UE may use in conjunction with uplink transmit switching. A first carrier (carrier 1) is an FDD carrier configured for uplink transmissions in this example. A second carrier (carrier 2) is a TDD carrier in this example. In some examples, one carrier may be an NR carrier and the other carrier may be an LTE carrier. In some examples, one carrier may use a sub-6-GHz band and the other carrier may use a millimeter wave (mmW) frequency band. In some examples, one carrier may use Frequency Range 1 (FR1) and the other carrier may use Frequency Range 2 (FR2). In some examples, one carrier may be an NR carrier and the other carrier may be an LTE carrier. The first and second carriers could take other forms in other examples.

As indicated by the respective lengths of the slots for carrier 1 and carrier 2, the communication on these carriers may use different subcarrier spacings (SCSs). As one non-limiting example, a 15 kHz subcarrier spacing (SCS) may be used on carrier 1 and a 30 kHz SCS may be used on carrier 2. Other SCSs may be used in other examples.

In the example of FIG. 6, a BS scheduled a UE to transmit on slots 0, 1, 2, and 3 of carrier 1. In addition, the BS scheduled the UE to transmit on slots 4, 8, and 9 of carrier 2. Thus, slot 4 of carrier 2 corresponds to case 1, where the UE simultaneously transmits on carrier 1 and carrier 2. Conversely, slot 8 (as well as slot 9) of carrier 2 corresponds to case 2, where the UE simultaneously transmits two signal streams (e.g., two MIMO layers) on carrier 2.

In the example of FIG. 6, at slot 2 of carrier 1 (slot 4 of carrier 2), the UE switches to case 1. The BS may send the grant for slot 2 of carrier 1 (slot 4 of carrier 2) at or before a time represented by a first dashed line 606. As indicated by a first arrow 608, this time may precede the scheduled slot(s) by an amount of time that is greater than the processing time required by the UE to decode the grants, etc., to transmit during the slot(s).

Also in the example of FIG. 6, at slot 4 of carrier 1 (slot 8 of carrier 2), the UE switches to case 2. The BS may send the grant for slot 4 of carrier 1 (slot 8 of carrier 2) at or before a time represented by a second dashed line 610. As indicated by a second arrow 612, this time may precede the scheduled slot(s) by an amount of time that is greater than the processing time required by the UE to decode the grants, etc., to transmit during the slot(s).

For inter-band uplink carrier aggregation, if a UE reports via capability signaling that it supports uplink transmit switching, the UE may further report via capability signaling different configurations (e.g., between Configuration 1 and Configuration 2) that are supported. FIG. 7 illustrates an example of Configuration 1 (single uplink) and Configuration 2 (dual uplink). In some examples, Configuration 1 may be referred to as a switched uplink (switchedUL) mode of operation and Configuration 2 may be referred to as a dual uplink (dualUL) mode of operation.

For Configuration 1, if uplink transmit switching is configured, the UE is not expected to be scheduled or configured with an UL transmission on carrier 2 for case 1. FIG. 7 illustrates the number of antenna ports that may be used for an uplink transmission on carrier 1 and carrier 2 for Configuration 1, case 1 and case 2. It can be seen that a UE operating under Configuration 1 does not support simultaneous transmission in both carriers.

For Configuration 2, if uplink transmit switching is configured, the UE can be scheduled or configured with an UL transmission on both carrier 1 and carrier 2 for case 1. The UE can be scheduled or configured with an UL transmission on either carrier 1 or carrier 2. The UE can be scheduled or configured with an UL transmission on both carrier 1 and carrier 2 simultaneously. FIG. 7 illustrates the number of antenna ports that may be used for an uplink transmission on carrier 1 and carrier 2 for Configuration 2, case 1 and case 2.

To support uplink transmit switching, a UE and a base station may exchange capability information and configuration information. An example of uplink transmit switching signaling for UE capability information is shown in Table 1.

TABLE 1

```
BandCombinationList-UplinkTxSwitch-r16 ::= SEQUENCE (SIZE (1..maxBandComb))
                                            OF BandCombination-UplinkTxSwitch-r16
BandCombination-UplinkTxSwitch-r16 ::= SEQUENCE {
[..]
  supportedBandPairListNR-r16     SEQUENCE (SIZE
```

TABLE 1-continued

```
        (1..maxULTxSwitchingBandPairs)) OF ULTxSwitchingBandPair-r16,
  uplinkTxSwitching-OptionSupport-r16 ENUMERATED {switchedUL, dualUL, both}
                                      OPTIONAL, (Supported mode of operation)
  ...
}
ULTxSwitchingBandPair-r16 ::= SEQUENCE {
  bandIndexUL1-r16      INTEGER(1..maxSimultaneousBands),
                              (bands between which the UE can switch)
bandIndexUL2-r16        INTEGER(1..maxSimultaneousBands),
uplinkTxSwitchingPeriod-r16 ENUMERATED {n35us, n140us, n210us},
                                          (length of switch)
uplinkTxSwitching-DL-Interruption-r16 BIT STRING
                     (SIZE(1..maxSimultaneousBands)) OPTIONAL
                     (signal which bands this switch will interrupt)
}
```

The BandCombination-UplinkTxSwitch may specify the band combinations supported by the UE for uplink transmit switching. For each supported pair of bands (SupportedBandPairList) from the band combinations, the UE may specify whether it supports a switched uplink mode of operation (switchedUL), a dual mode of operation (dualUL), or both. For each band pair (ULTxSwitchingBandPair), the UE also specifies the bands (bandIndexUL1, UL2) between which the UE can switch, timing information (uplinkTxSwitchingPeriod) for each switch (e.g., the time it takes to switch a power amplifier from one band to another), and downlink bands affected (e.g., interrupted) by the switch (uplinkTxSwitching-DL-Interruption).

An example of uplink transmit switching signaling for a configuration sent by a base station in response to the uplink transmit switching capability discussed above is shown in Table 2. Here, the base station specifies whether the UE is to operate in the switchedUL mode of operation or the dualUL mode of operation.

TABLE 2

```
CellGroupConfig ::=      SEQUENCE {
[...]
  uplinkTxSwitchingOption-r16      ENUMERATED
{switchedUL, dual UL}
-Need R(configuration of TX Switching - it can be switchedUL
or dualUL)
]]
}
```

The disclosure relates in some aspects to calculating a peak data rate for a UE when the UE supports uplink transmit switching. One example peak data rate calculation is specified by 3GPP TS 38.306 V15.10.0 (2020 July) section 4.1.2 as follows. For NR, the approximate data rate for a given number of aggregated carriers in a band or band combination is computed as set forth in Equation 1.

EQUATION 1

$$\text{Data rate (in Mbps)} = 10^{-6}\sum_{j=1}^{J}\left(v_{Layers}^{(j)}\cdot Q_m^{(j)}\cdot f^{(j)}\cdot R_{max}\cdot\frac{N_{PRB}^{BW(j),\mu}\cdot 12}{T_s^{\mu}}\left(1-OH^{(j)}\right)\right)$$

In Equation 1, J is the number of aggregated component carriers in a band or band combination and $R_{max}$=948/1024.

For the j-th CC:

$$v_{Layers}^{(j)}$$

is the maximum number of supported layers given by higher layer parameter maxNumberMIMO; LayersPDSCH for downlink and maximum of higher layer parameters maxNumberMIMO-LayersCB-PUSCH and maxNumber-MIMO-LayersNonCB-PUSCH for uplink;

$$Q_m^{(j)}$$

is the maximum supported modulation order given by higher layer parameter supportedModulationOrderDL for downlink and higher layer parameter supportedModulationOrderUL for uplink; $f^{(j)}$ is the scaling factor given by higher layer parameter scalingFactor and can take the values 1, 0.8, 0.75, and 0.4; μ is the numerology (e.g., as defined in 3GPP TS 38.211 V15.8.0 (2019 December) section 4.2;

$$T_s^{\mu}$$

is the average OFDM symbol duration in a subframe for numerology μ of Equation 2 below. A normal cyclic prefix is assumed.

$$N_{PRB}^{BW(j),\mu}$$

is the maximum RB allocation in bandwidth $BW^{(j)}$ with numerology μ, as defined in 3GPP TS 38.101-1 V15.10.0 (2020 July) section 5.3 and 3GPP TS 38.101-2 V16.4.0 (2020 June) section 5.3, where $BW^{(j)}$ is the UE supported maximum bandwidth in the given band or band combination.

$$N_{PRB}^{BW(j),\mu}$$

is the maximum RB allocation in bandwidth $BW^{(j)}$ with numerology μ, as defined in 3GPP TS 38.101-1 V15.10.0 (2020 July) section 5.3 and 3GPP TS 38.101-2 V16.4.0 (2020 June) section 5.3, where $BW^{(j)}$ is the UE supported maximum bandwidth in the given band or band combination. $OH^{(j)}$ is the overhead and takes the following values: 0.14, for frequency range FR1 for DL; 0.18, for frequency range FR2 for DL; 0.08, for frequency range FR1 for UL; 0.10, for frequency range FR2 for UL. Only one of the UL or supplementary uplink (SUL) carriers (the one with the higher data rate) is counted for a cell operating SUL. The approximate maximum data rate can be computed as the maximum of the approximate data rates computed using the above formula for each of the supported band or band combinations.

$$T_s^{\mu} = \frac{10^{-3}}{14 \times 2^{\mu}}. \quad \text{EQUATION 2}$$

If a UE is scheduled with a higher data rate than the maximum data rate of Equation 1, the UE is not required to handle the scheduled transmission. For example, within a cell group, a UE is not required to handle PUSCH(s) transmission in slot $s_j$ in serving cell j, and for j=0, 1, 2 . . . J−1, slot $s_j$ overlapping with any given point in time, if the following condition of Equation 3 is not satisfied at that point in time.

$$\sum_{j=0}^{J-1} \frac{\sum_{m=0}^{M-1} V_{j,m}}{T_{slot}^{\mu(j)}} \le \text{Data Rate}, \quad \text{EQUATION 3}$$

Here, J is the number of configured serving cells belong to a frequency range. For the j-th serving cell, M is the number of TB(s) transmitted in slot $s_j$, $$T_{slot}^{\mu(j)} = \frac{10^{-3}}{2^{\mu(j)}}$$

where μ(j) is the numerology for PUSCH(s) in slot $s_j$ of the j-th serving cell.

For the m-th TB, $$V_{j,m} = C' \times \left\lfloor \frac{A}{C} \right\rfloor,$$

A is the number of bits in the transport block as defined in 3GPP TS 38.212 V15.9.0 (2020 June) section 6.2.1, C is the total number of code blocks for the transport block defined in 3GPP TS 38.212 V15.9.0 (2020 June) section 5.2.2, and C' is the number of scheduled code blocks for the transport block as defined in 3GPP TS 38.212 V15.9.0 (2020 June) section 5.4.2.1.

The parameter Data Rate may be computed as the maximum data rate summed over all the carriers in the frequency range for any signaled band combination and feature set consistent with the configured servings cells, where the data rate value is given by the formula in 3GPP TS 38.306 V15.10.0 (2020 July) section 4.1.2, including the scaling factor f(i). In some examples, the Data Rate parameter of Equation 3 is in megabits per second (Mbps).

For a j-th serving cell, if the higher layer parameter processingType2Enabled of PUSCH ServingCellConfig is configured for the serving cell and set to enable, or if at least one $I_{MCS}$>W for a PUSCH, where W=28 for MCS tables 5.1.3.1-1 and 5.1.3.1-3, and W=27 for MCS tables 5.1.3.1-2, 6.1.4.1-1, and 6.1.4.1-23 [in GPP TS 38.214 V15.10.0 (2020 June)], the UE is not required to handle PUSCH transmissions, if the following condition set forth in Equation 4 is not satisfied.

$$\frac{\sum_{m=0}^{M-1} V_{j,m}}{L \times T_s^{\mu}} \le \text{Data Rate } CC \quad \text{EQUATION 4}$$

Here, L is the number of symbols assigned to the PUSCH, M is the number of TB in the PUSCH, $$T_s^{\mu} = \frac{10^{-3}}{2^{\mu} \times N_{symb}^{slot}}$$

where μ is the numerology of the PUSCH.

For the m-th TB, $$V_{j,m} = C' \times \left\lfloor \frac{A}{C} \right\rfloor,$$

A is the number of bits in the transport block as defined in 3GPP TS 38.212 V15.9.0 (2020 June) section 6.2.1, C is the total number of code blocks for the transport block defined in 3GPP TS 38.212 V15.9.0 (2020 June) section 5.2.2, C' is the number of scheduled code blocks for the transport block as defined in 3GPP TS 38.212 V15.9.0 (2020 June) section 5.4.2.1.

The parameter Data Rate CC may be computed as the maximum data rate for a carrier in the frequency band of the serving cell for any signaled band combination and feature set consistent with the serving cell, where the data rate value is given by the formula in 3GPP TS 38.306 V15.10.0 (2020 July) section 4.1.2, including the scaling factor f(i). In some examples, the Data Rate CC parameter of Equation 4 is in megabits per second (Mbps).

The peak data rate equation set forth above in Equation 1 does not account for the fact that, with uplink transmit switching, a UE might not transmit in all uplink carriers with maximum capability at the same time. For example, depending on the capability, the UE may be able to do the following for the switchedUL and dualUL modes of operation.

If the UE reports switchedUL capability, the UE can only transmit in one carrier at the same time. For example, the UE may transmit in CC1 or transmit in CC2.

If the UE reports dualUL capability, any of the following capabilities are supported, but not simultaneously. The UE may transmit one (1) layer in CC1+one (1) layer in CC2; OR the UE may transmit two (2) layers in CC1; OR the UE may transmit two (2) layers in CC2. The above assumes that both CC1 and CC2 support two (2) layers. If CC2 supports a single layer only, the last case would not be used.

From the above, although the UE's capability may indicate that it supports transmission on two ports on one carrier as well as transmission on two carriers, the UE does not support transmission on two ports on a first carrier and another port on a second carrier at the same time. In other words, the UE does not support peak data rates across all carriers at the same time.

However, the number of layers v of Equation 1 does not take this into account. For example, using Equation 1, a peak data rate for the first carrier would be calculated with v=2 and a peak data rate for the second carrier would be calculated with v=1.

The disclosure relates in some aspects to an improved peak rate calculation for uplink transmit switching. In some examples, a band combination using uplink transmit switching (e.g., a band combination signaled in BandCombinationList-UplinkTxSwitch) is different from a band combination not using uplink transmit switching. For example, the peak data rate determination may depend on whether uplink transmit switching is used or not.

In some examples, the peak data rate may additionally depend on the number of simultaneously supported carriers. For example, the calculation of the peak data rate may depend on whether the UE supports switchedTx, dualTx, or both.

If the UE supports switchedTx, then only one of the uplink carriers may be counted for the band combination. For example, an uplink component carrier with the higher data rate may be used for the peak data rate calculation.

If a UE supports dualTx or both, there is a limitation of a maximum of two uplink layers across all the uplink carriers. In this case, the peak data rate may be obtained as the maximum data rate across all possible combinations that include two uplink layers.

For both cases, the data rate can be obtained by modifying Equation 1 as set forth in Equation 5.

$$\text{Data rate (in Mbps)} = 10^{-6}\sum_{j=1}^{J}\left(S_{Layers}^{(j)}\cdot Q_m^{(j)}\cdot f^{(j)}\cdot R_{max}\cdot\frac{N_{PRB}^{BW(j),\mu}\cdot 12}{T_s^{\mu}}\left(1-OH^{(j)}\right)\right)$$

With the additional constraint that:

$$S_{Layers}^{(j)}\le v_{Layers}^{(j)} \qquad \text{EQUATION 5}$$

$$\sum S_{Layers}^{(j)}\le 2$$

In Equation 5, the parameter S replaces the parameter v (configured number of layers) of Equation 1. Here, the parameter S is constrained so that for each carrier j, S will not be larger than v for that carrier. In addition, the parameter S summed over all carriers will not be larger than the total number of transmit chains of the UE. Accordingly, the peak data rate calculated by the UE according to Equation 5 will not exceed the simultaneous transmission capability of the UE. For the case of a UE configured with two carriers for uplink transmit switching (UL Tx switching), a first carrier with two layers and a second carrier with one layer, the data rate may be computed as the maximum between the data rate for the case of one layer configured in each carrier, and the data rate for the case of two layers configured in the first carrier and zero layers for the second carrier.

This peak data rate calculation described above may be used for more than two transmit chains. For example, the peak data rate calculation can be extended to the case of three or more chains, by adding a corresponding constraint (e.g., the total number of layers is <=X, with X the reported maximum number of chains) as set forth in Equation 6.

$$\sum S_{Layers}^{(j)}\le X,\text{ with the number of reported chains} \qquad \text{EQUATION 6}$$

Figure 8:
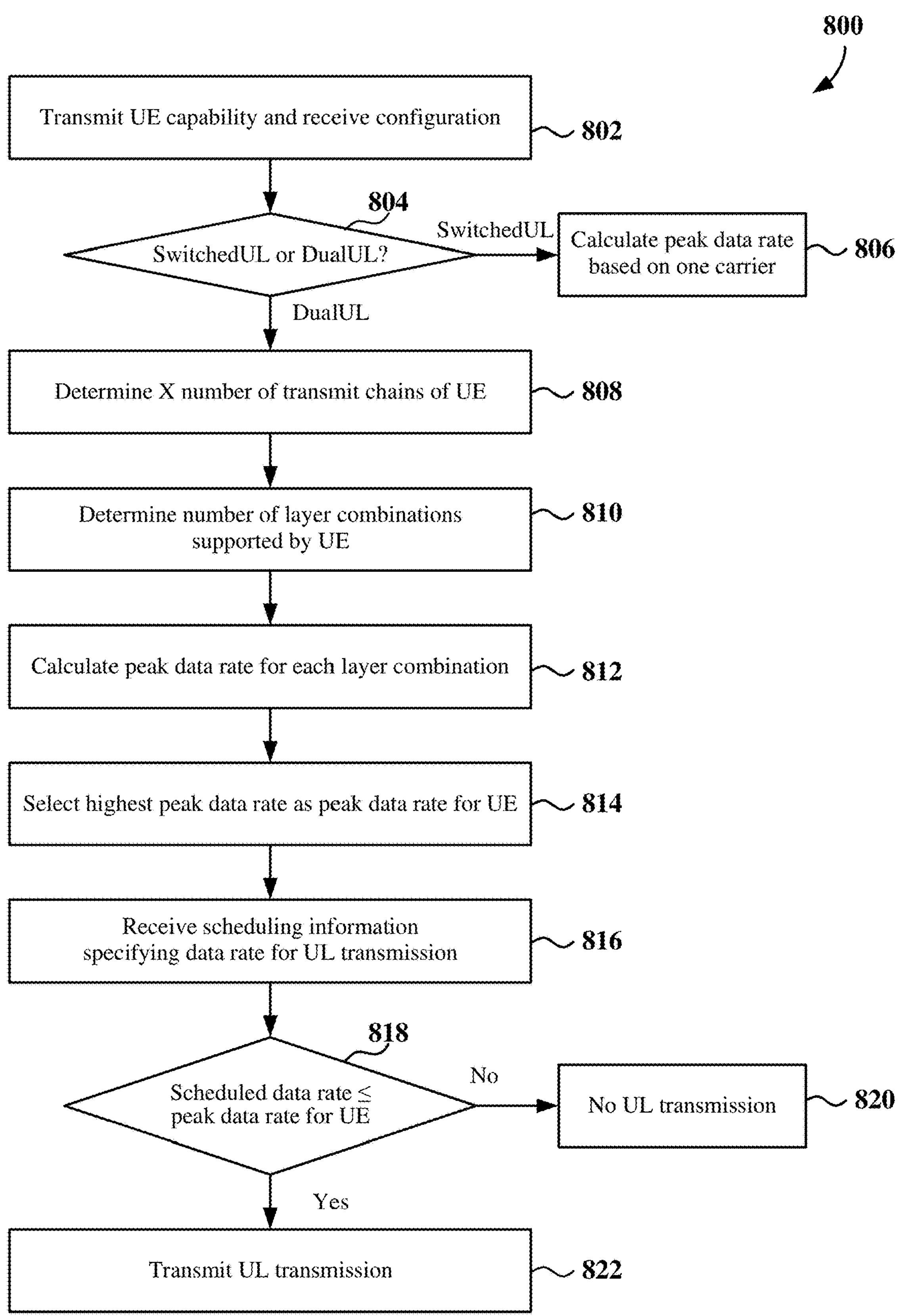
FIG. 8 is a flow chart of an example peak data rate calculation method according to some aspects.

FIG. 8 is a flow chart illustrating an example method 800 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 800 may be carried out by the user equipment 1200 illustrated in FIG. 12. In some examples, the method 800 may be carried out by any suitable apparatus or means for carrying out the functions or algorithm described below.

At block 802, a UE may transmit its capability information to a serving base station and receive configuration information from the base station. For example, the UE may transmit the BandCombinationList-UplinkTxSwitch capability information to a base station and receive the uplinkTxSwitchingOption configuration from the base station.

At block 804, the peak data rate calculation depends on whether the UE is configured for (or reports a capability of supporting) a switchedUL mode of operation or a dualUL mode of operation. If the UE is configured for a switchedUL mode of operation, or if the UE supports only switchedUL operation, the peak data rate is calculated based on a single carrier since the UE only transmits on one carrier in this case.

If the UE is configured for a dualUL mode of operation, or reports a capability of operating with dualUL, the peak data rate is calculated as set forth in blocks 808-814. At block 808, the UE determines the number X (e.g., X=2 for dualUL) of transmit chains of the UE. At block 810, the UE determines the number of layer combinations supported by the UE. For example, for dualUL, the UE may be capable of simultaneous transmission on CC1 and CC2, two transmissions on CC1, or two transmissions on CC2. At block 812, the UE calculates the peak data rate for each layer combination using Equation 5. At block 814, the UE selects the highest peak data rate of the peak data rates calculated at block 812 as the peak data rate for the UE.

As represented by block 816, at some point in time, the UE will receive scheduling information from a base station (e.g., via DCI). As discussed above, this scheduling information may specify a data rate for an uplink transmission by the UE. Accordingly, at block 818, the UE determines whether the scheduled data rate is less than or equal to the peak data rate for the UE as calculated at block 814. For example, the UE may use Equation 3 described above. In some examples, if the scheduled data rate is not less than or equal to the peak data rate, the UE does not transmit the scheduled transmission (block 820). On the other hand, in some examples, if the scheduled data rate is less than or equal to the peak data rate, the UE transmits the scheduled transmission (block 822).

Figure 9:
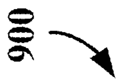
FIG. 9 is a conceptual illustration of an example of RF carriers for an uplink transmit switching and fixed radio frequency (RF) carrier scenario according to some aspects.
Figure 9:
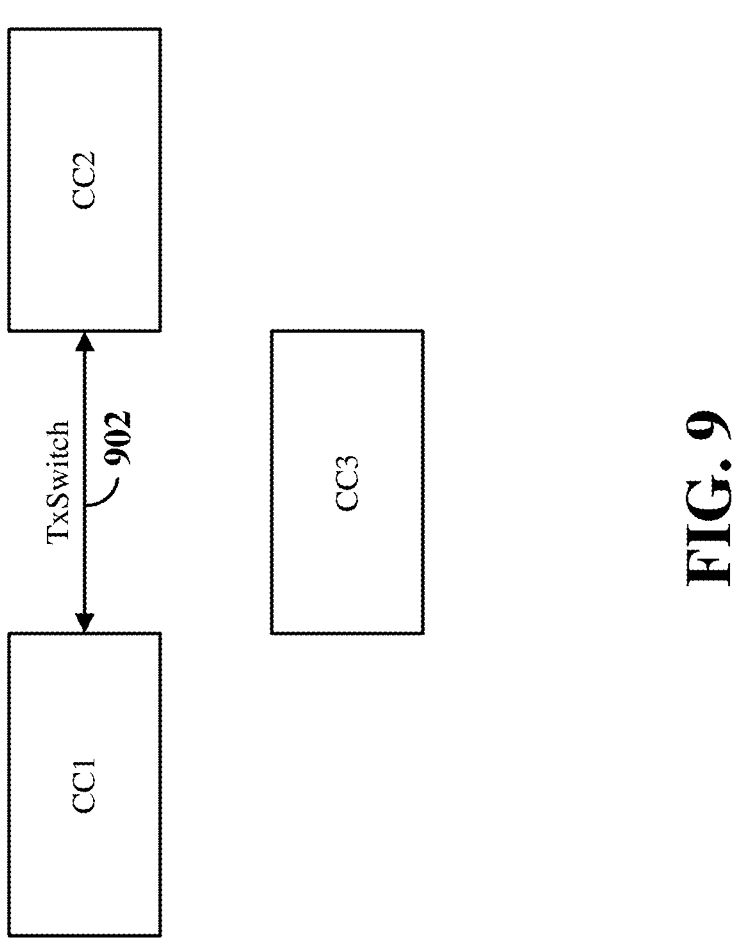

In some cases, a UE may have a set of CCs with a fixed uplink, and a set of CCs with a switched uplink. The disclosure relates in some aspects to calculating a peak data rate for a UE in a scenario where the UE supports uplink transmit switching (Switched UL) and at least one fixed RF carrier. For example, as shown in the diagram 900 of FIG. 9, a UE (e.g., with three transmit chains) may support uplink switching 902 between CC1 and CC2 using two transmit chains as discussed herein. In addition, the UE may have a third transmit chain that is only used for CC3 (i.e., the UE does not perform uplink transmit switching between CC3 and any other carrier). In this case, the "maximum" peak data rate is taken only across the CCs with switched uplink. For example, in the scenario of FIG. 9, the maximum would be taken over "CC1/CC2" switching, and CC3 would be fixed. Thus, the final peak data rate for the UE may be calculated by calculating a first peak data rate for CC1/CC2 switching using Equation 5, calculating a second peak data rate for CC3 using Equation 1, and adding the first peak data rate to the second peak data rate.

The disclosure relates in some aspects to signaling a capability of uplink transmit switching (Switched UL) and at least one fixed RF carrier. For example, a UE may signal that it supports band 1, band 2, and band 3 (e.g., the BandCombination-UplinkTxSwitch capability), but only supports uplink transmit switching between band 1 and band 2. This implies that band 3 is fixed. As another example, the UE may explicitly signal that band 3 is fixed. Similar techniques may be used to signal multiple fixed bands.

Figure 10:
FIG. 10 is a conceptual illustration of an example of uplink transmit switching on multiple sets of RF carriers according to some aspects.
Figure 10:
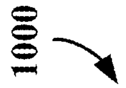
Figure 10:
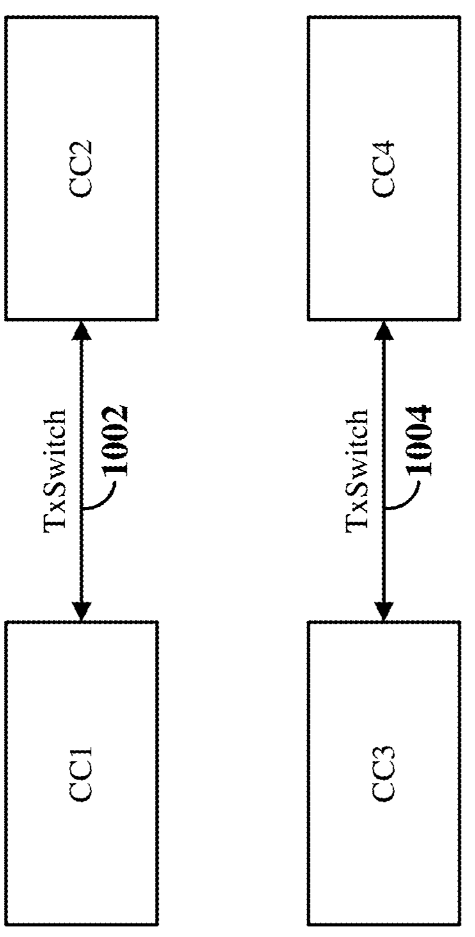

The disclosure relates in some aspects to calculating a peak data rate for a UE in a scenario where the UE supports multiple uplink switching groups. For example, as shown in the diagram 1000 of FIG. 10, a UE (e.g., with four transmit chains) may support uplink transmit switching 1002 between CC1 and CC2 using two transmit chains (e.g. as discussed herein) and also support uplink transmit switching 1004 between CC3 and CC4 using two other transmit chains (e.g., as discussed herein). In this case, a separate maximum peak data rate is taken between each switching group. For example, for the scenario of FIG. 10, a first peak data rate is calculated for {CC1,CC2} with S=2 and a second peak data rate is calculated for {CC3, CC4} with S=2. The first peak data rate and the second peak data rate may then be added together to provide the total peak data rate for the UE.

The disclosure relates in some aspects to signaling a capability of uplink transmit switching (Switched UL) for multiple sets of carriers. For example, a UE may signal that it supports band 1, band 2, band 3, and band (e.g., the BandCombination-UplinkTxSwitch capability), but only supports uplink transmit switching between band 1 and band 2, and between band 3 and band 4. Similar techniques may be used to signal uplink transmit switching for additional sets of carriers.

Figure 11:
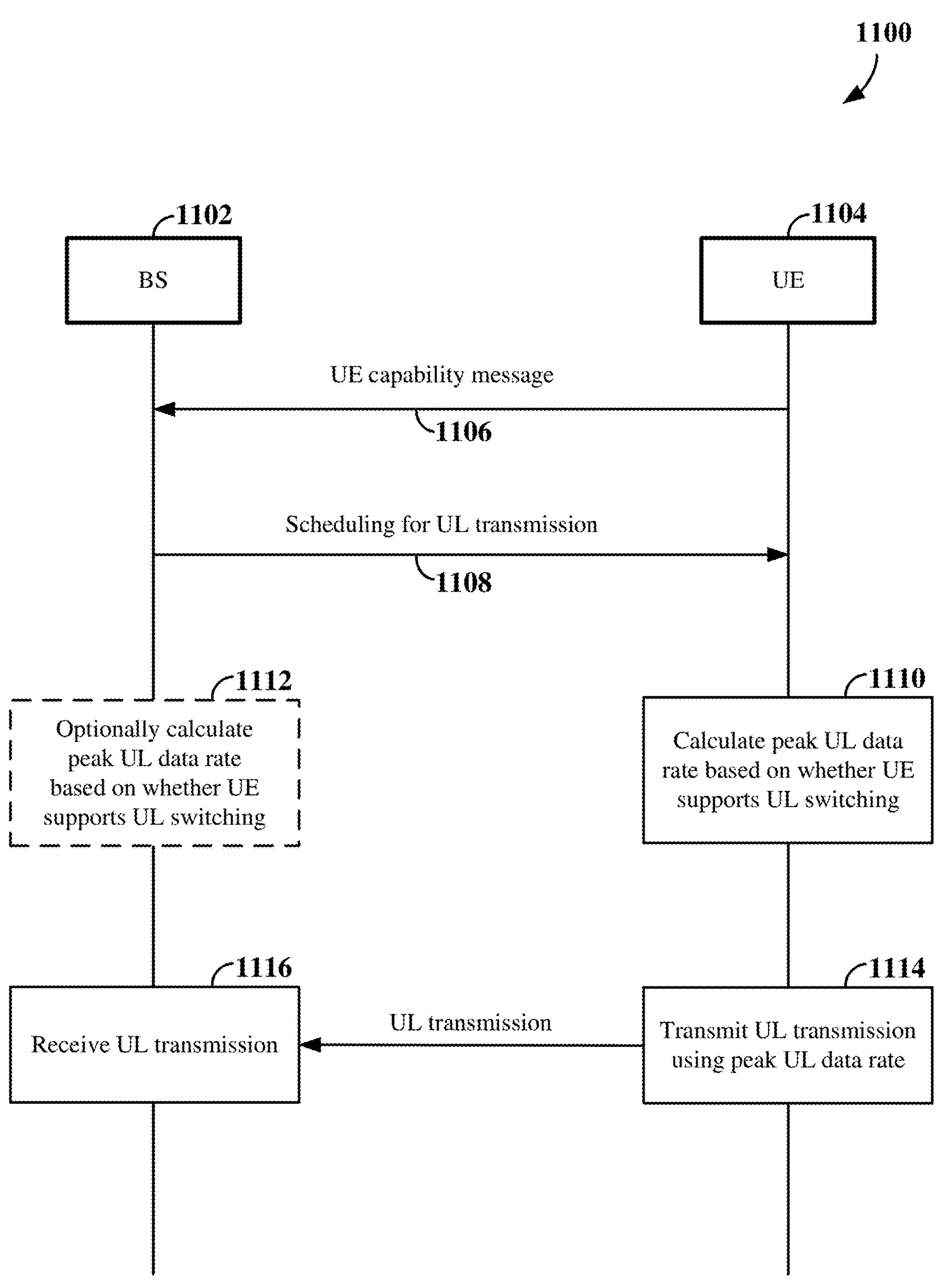
FIG. 11 is a diagram illustrating an example of signaling associated with a peak data rate calculation according to some aspects.

FIG. 11 is a diagram illustrating an example of signaling 1100 associated with calculating a peak data rate in a wireless communication network including a base station (BS) 1102 and a user equipment (UE) 1104. In some examples, the BS 1102 may correspond to any of the base stations or scheduling entities shown in any one or more of FIGS. 1, 2, 4, 5, and 15. In some examples, the UE 1104 may correspond to any of the UEs or scheduled entities shown in any one or more of FIGS. 1, 2, 4, 5, and 12.

At 1106 of FIG. 11, the UE 1104 sends a UE capabilities message to the BS 1102 (e.g., via RRC signaling). In some examples, the UE capabilities message may indicate whether the UE supports UL switching. For example, the UE capabilities message may include the BandCombination-List-UplinkTxSwitch capability information discussed above.

At 1108, the BS 1102 schedules the UE 1104 for an UL transmission. For example, the BS 1102 may send a DCI that allocates resources on one or more layers (e.g., RF carriers, streams, etc.).

At 1110, the UE 1104 calculates a peak UL data rate for the UL transmission based on whether the UE 1104 supports UL switching. For example, the peak data rate calculation may depend on whether the UE 1104 is configured for (or reports a capability of supporting) a switchedUL mode of operation or a dualUL mode of operation as discussed above.

At optional block 1112, the BS 1102 may calculate the peak UL data rate to be used by the UE 1104 for the scheduled UL transmission. In some aspects, this calculation may be based on whether the UE 1104 supports UL switching (e.g., as indicated by the UE capability message sent at 1106). For example, the peak data rate calculation may depend on whether the UE is configured for (or reports a capability of supporting) a switchedUL mode of operation or a dualUL mode of operation as discussed above.

At 1114, the UE 1104 transmits the UL transmission using the peak UL data rate calculated at 1110. Thus, a 1116, the BS 1102 receives the UL transmission at the calculated peak UL data rate.

Figure 12:
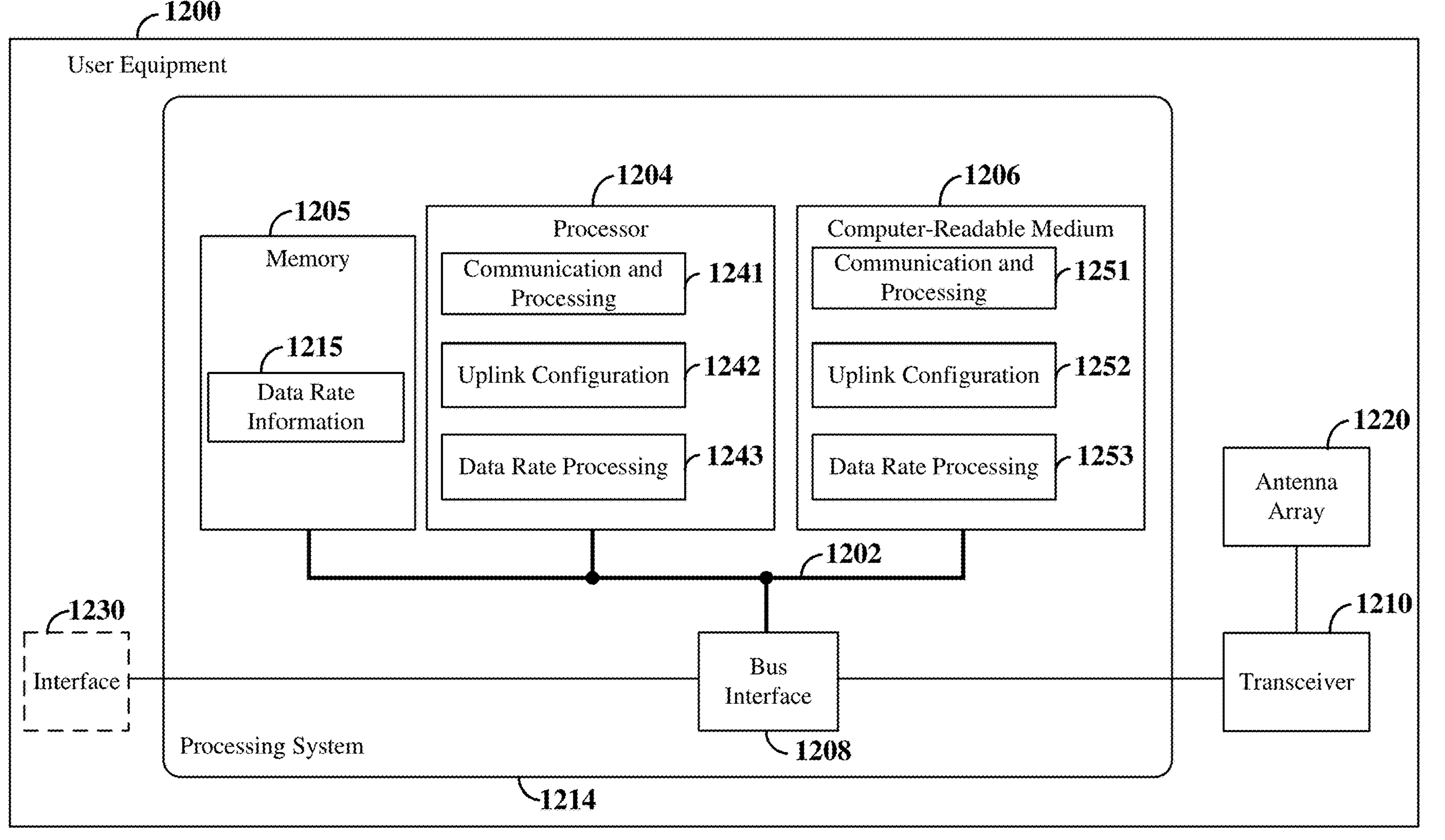
FIG. 12 is a block diagram conceptually illustrating an example of a hardware implementation for a user equipment employing a processing system according to some aspects.

FIG. 12 is a block diagram illustrating an example of a hardware implementation for a UE 1200 employing a processing system 1214. For example, the UE 1200 may be a device configured to wirelessly communicate with a base station, as discussed in any one or more of FIGS. 1-11. In some implementations, the UE 1200 may correspond to any of the UEs or scheduled entities shown in any one or more of FIGS. 1, 2, 4, 5, and 11.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and an antenna array 1220, and an interface between the bus 1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may include data rate information 1215 (e.g., associated with uplink switching) that may be used by the processor 1204 for transmission operations as discussed herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 1-11 and as described below in conjunction with FIGS. 13-14). In some aspects of the disclosure, the processor 1204, as utilized in the UE 1200, may include circuitry configured for various functions.

The processor 1204 may include communication and processing circuitry 1241. The communication and processing circuitry 1241 may be configured to communicate with a base station, such as a gNB. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains. The communication and processing circuitry 1241 may further be configured to execute communication and processing software 1251 included on the computer-readable medium 1206 to implement one or more functions described herein.

In some examples, the communication and processing circuitry 1241 may be configured to generate and transmit a scheduling request (e.g., via UCI in a PUCCH) to the base station to receive an uplink grant for the PUSCH. The communication and processing circuitry 1241 may further be configured to generate an uplink signal and interact with the transceiver 1210 to transmit the uplink signal. The uplink signal may include, for example, a PUCCH, a PUSCH, an SRS, a DMRS, or a physical random access channel (PRACH). The communication and processing circuitry 1241 may further be configured to interact with the transceiver 1210 to monitor for a downlink signal and decode a downlink signal. The downlink signal may include, for example, a PDCCH, a PDSCH, a CSI-RS, or a DMRS.

In some implementations where the communication involves receiving information, the communication and processing circuitry 1241 may obtain information from a component of the UE 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include uplink configuration circuitry 1242 configured to perform uplink configuration-related operations as discussed herein. The uplink configuration circuitry 1242 may be configured to execute uplink configuration software 1252 included on the computer-readable medium 1206 to implement one or more functions described herein.

The uplink configuration circuitry 1242 may include functionality for a means for determining whether the user equipment supports uplink switching. For example, the uplink configuration circuitry 1242 may be configured to access UE capability information (e.g., BandCombination-List-UplinkTxSwitch capability information) stored on the user equipment 1200 (e.g., in the memory 1205) and process the information to determine, for example, whether the UE is configured for (or has reported a capability of supporting) a switchedUL mode of operation or a dualUL mode of operation as discussed above.

The uplink configuration circuitry 1242 may include functionality for a means for receiving scheduling information for a transmission on at least one radio frequency carrier of a plurality of radio frequency carriers. For example, the uplink configuration circuitry 1242 may be configured to receive a scheduling message (e.g., a DCI, etc.) from a gNB on a channel (e.g., a PDCCH) allocated for the user equipment 1200 and parse the message to identify the resources allocated by the gNB for an uplink transmission by the user equipment 1200.

The processor 1204 may include data rate processing circuitry 1243 configured to perform data rate processing-related operations as discussed herein. The data rate processing circuitry 1243 may be configured to execute data rate processing software 1253 included on the computer-readable medium 1206 to implement one or more functions described herein.

The data rate processing circuitry 1243 may include functionality for a means for calculating a peak uplink data rate. For example, the data rate processing circuitry 1243 may be configured to calculate a peak uplink data rate based on whether the user equipment 1200 supports UL transmit switching as discussed above in conjunction with FIG. 8.

The data rate processing circuitry 1243 may include functionality for a means for transmitting a transmission on at least one radio frequency carrier according to a peak uplink data rate for a time slot. For example, the data rate processing circuitry 1243 may be configured to cause the communication and processing circuitry 1241 to transmit an UL transmission on allocated resources using the calculated peak uplink data rate.

Figure 13:
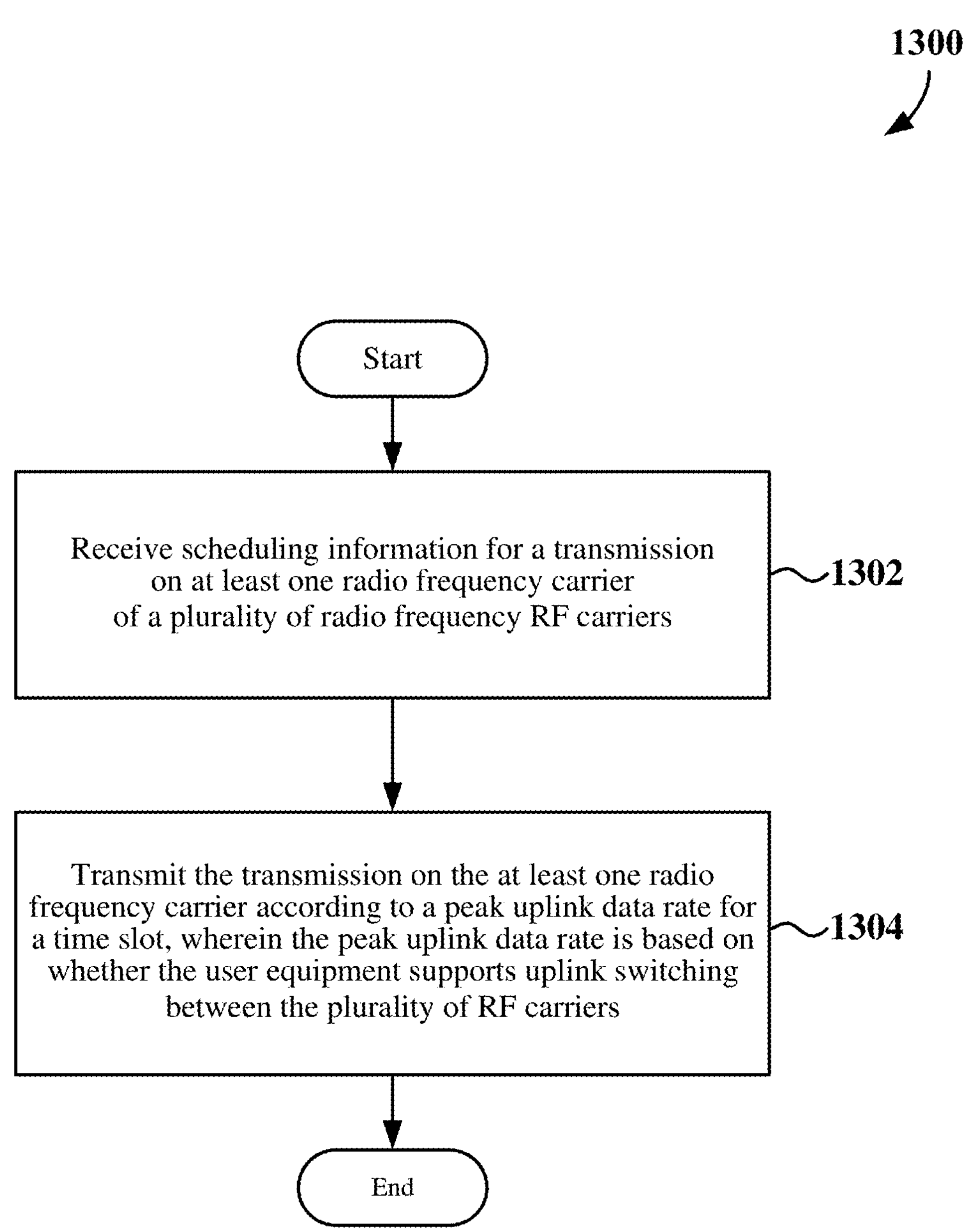
FIG. 13 is a flow chart of an example communication method according to some aspects.

FIG. 13 is a flow chart illustrating an example method 1300 for wireless communication according to some aspects. As described below, some or all illustrated features may be omitted in a particular implementation within the scope of the present disclosure, and some illustrated features may not be required for implementation of all examples. In some examples, the method 1300 may be carried out by the user equipment 1200 illustrated in FIG. 12 or by any suitable apparatus or means for carrying out the functions or algorithm described below.

At block 1302, a user equipment may receive scheduling information for a transmission on at least one radio frequency carrier of a plurality of radio frequency carriers. For example, the uplink configuration circuitry 1242 together with the communication and processing circuitry 1241 and the transceiver 1210, shown and described above in connection with FIG. 12, may provide a means to receive scheduling information for a transmission on at least one radio frequency carrier of a plurality of radio frequency carriers. In some examples, the plurality of radio frequency carriers may correspond to a plurality of multiple-input-multiple-output (MIMO) layers.

At block 1304, the user equipment may transmit the transmission on the at least one radio frequency carrier according to a peak uplink data rate for a time slot, wherein the peak uplink data rate is based on whether the user equipment supports uplink switching between the plurality of radio frequency carriers. For example, the data rate processing circuitry 1243 together with the communication and processing circuitry 1241 and the transceiver 1210, shown and described above in connection with FIG. 12, may provide a means to transmit the transmission on the at least one radio frequency carrier according to a peak uplink data rate for a time slot, wherein the peak uplink data rate is based on whether the user equipment supports uplink switching between the plurality of radio frequency carriers. In some examples, the peak uplink data rate may be the Data Rate parameter discussed above. In some examples, the uplink switching may be the UL Tx Switching discussed above.

In some examples, the user equipment may calculate the peak uplink data rate based on a maximum quantity of the plurality of radio frequency carriers on which the user equipment can transmit during the time slot (e.g., 1 carrier for switchedUL and 2 carriers for dualUL). In some examples, the user equipment may determine the maximum quantity of the plurality of radio frequency carriers based on whether the user equipment supports uplink transmission on a single radio frequency carrier of the plurality of radio frequency carriers at a time (e.g., switchedUL), concurrent uplink transmissions on the plurality of radio frequency carriers (e.g., dualUL), or a combination thereof. In some examples, the user equipment may determine the maximum quantity of the plurality of radio frequency carriers based on whether the user equipment further supports at least one fixed uplink radio frequency carrier (e.g., CC3), wherein the user equipment does not support uplink switching between the at least one fixed uplink radio frequency carrier and any other radio frequency carrier. In some examples, the user equipment may determine the maximum quantity of the plurality of radio frequency carriers based on whether the user equipment supports uplink switching between a first set of radio frequency carriers of the plurality of radio frequency carriers (e.g., CC1 and CC2) and between a second set of radio frequency carriers of the plurality of radio frequency carriers (e.g., CC3 and CC4).

In some examples, the user equipment may determine that the user equipment supports uplink transmission on a single radio frequency carrier of the plurality of radio frequency carriers at a time (e.g., switchedUL), identify a first radio frequency carrier of the plurality of radio frequency carriers that is associated with a highest peak uplink data rate of the plurality of radio frequency carriers, and calculate the peak uplink data rate based on a quantity of layers supported by the user equipment for the first radio frequency carrier.

In some examples, the user equipment may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), and select a highest peak uplink data rate from the first peak uplink data rate and the second peak uplink data rate to provide the peak uplink data rate for the time slot.

In some examples, the user equipment may determine a first constraint on a first maximum quantity of layers for a first radio frequency carrier of the plurality of radio frequency carriers (e.g., the $v_{Layers}$ constraint for CC1), determine a second constraint on a second maximum quantity of layers for a second radio frequency carrier of the plurality of radio frequency carriers (e.g., the $v_{Layers}$ constraint for CC2), determine a third constraint on a third maximum quantity of layers for the plurality of radio frequency carriers (e.g., $\Sigma S_{Layers}$ constrained by 2 for dualUL or constrained by X), and calculate the peak uplink data rate for the time slot based on the first constraint, the second constraint, and the third constraint.

In some examples, the user equipment may determine that the user equipment supports concurrent uplink transmissions on the plurality of radio frequency carriers (e.g., dualUL), determine a maximum quantity of layers supported by the user equipment for the concurrent uplink transmissions, calculate different peak uplink data rates for different combinations of the maximum quantity of layers across the plurality of radio frequency carriers (e.g., calculate a $1^{st}$ peak rate for 1+1, calculate a $2^{nd}$ peak rate for 2+0), and select a highest peak uplink data rate of the different peak uplink data rates to provide the peak uplink data rate for the time slot.

In some examples, to determine the maximum quantity of layers, the user equipment may determine a first maximum quantity of layers for a particular radio frequency carrier of the plurality of radio frequency carriers as constrained by a first layer capability for the particular radio frequency carrier (e.g., the $v_{Layers}$ constraint).

In some examples, to determine the maximum quantity of layers, the user equipment may determine a first maximum quantity of layers for a first radio frequency carrier of the plurality of radio frequency carriers as constrained by a first layer capability for the first radio frequency carrier (e.g., the $v_{Layers}$ constraint for CC1), determine a second maximum quantity of layers for a second radio frequency carrier of the plurality of radio frequency carriers as constrained by a second layer capability for the second radio frequency carrier (e.g., the $v_{Layers}$ constraint for CC2), sum the first maximum quantity of layers for the first radio frequency carrier and the second maximum quantity of layers for the second radio frequency carrier to provide a third maximum quantity of layers for the plurality of radio frequency carriers (e.g., $\Sigma S_{Layers}$), and determine a final maximum quantity of layers based on the third maximum quantity of layers for the plurality of radio frequency carriers as constrained by a maximum quantity of transmit chains of the user equipment (e.g., $\Sigma S_{Layers}$ constrained by 2 for dualUL or constrained by X).

In some examples, the user equipment may calculate a first peak uplink data rate for the plurality of radio frequency carriers (e.g., CC1 and CC2), calculate a second peak uplink data rate for another radio frequency carrier (e.g., CC3), and sum the first peak uplink data rate and the second peak uplink data rate to provide the peak uplink data rate for the time slot.

In some examples, the user equipment may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for switched radio frequency carriers from the first peak uplink data rate and the second peak uplink data rate (e.g., select the highest Data Rate for dualUL), calculate at least one third peak uplink data rate for at least one fixed uplink radio frequency carrier (e.g., calculate Data Rate for CC3), wherein the user equipment does not support uplink switching between the at least one fixed uplink radio frequency carrier and any other radio frequency carrier, and sum the highest peak uplink data rate for switched radio frequency carriers (e.g., the highest Data Rate for dualUL) and the at least one third peak uplink data rate for the at least one fixed uplink radio frequency carrier (e.g., Data Rate for CC3) to provide the peak uplink data rate for the time slot.

In some examples, the user equipment may transmit a first indication that the user equipment supports at least one fixed uplink radio frequency carrier (e.g., CC3), and the uplink switching between the plurality of radio frequency carriers (e.g., UL Tx Switching). In some examples, the user equipment may receive a second indication that configures the user equipment to transmit on a single radio frequency carrier of the plurality of radio frequency carriers at a time (e.g., switchedUL), concurrently transmit on the plurality of radio frequency carriers (e.g., dualUL), transmit on the at least one fixed uplink radio frequency carrier, or a combination thereof.

In some examples, the user equipment may calculate a first peak uplink data rate for the plurality of radio frequency carriers (e.g., calculate Data Rate for CC1 and CC2), calculate a second peak uplink data rate for a second plurality of radio frequency carriers (e.g., calculate Data Rate for CC3 and CC4), and sum the first peak uplink data rate and the second peak uplink data rate to provide the peak uplink data rate for the time slot.

In some examples, the user equipment may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for a first set of switched radio frequency carriers (e.g., CC1 and CC2) from the first peak uplink data rate and the second peak uplink data rate, calculate a third peak uplink data rate for carrier aggregation on a third radio frequency carrier of another plurality of radio frequency carriers (e.g., calculate Data Rate for CA on CC3), calculate a fourth peak uplink data rate for concurrent transmissions on the third radio frequency carrier and a further radio frequency carrier of the other plurality of radio frequency carriers (e.g., calculate Data Rate for simultaneous Tx on CC3 and CC4), select another highest peak uplink data rate for a second set of switched radio frequency carriers (e.g., CC3 and CC4) from the third peak uplink data rate and the fourth peak uplink data rate, and sum the highest peak uplink data rate for the first set of switched radio frequency carriers (e.g., CC1 and CC2) and the other highest peak uplink data rate for the second set of switched radio frequency carriers (e.g., CC3 and CC4) to provide the peak uplink data rate for the time slot.

In some examples, the user equipment may transmit a first indication that the user equipment supports the uplink switching between the plurality of radio frequency carriers (e.g., UL Tx Switching on CC1 and CC2), and uplink switching between a second plurality of radio frequency carriers (e.g., UL Tx Switching on CC3 and CC4). In some examples, the user equipment may receive a second indication that configures the user equipment to transmit on a single radio frequency carrier of the plurality of radio frequency carriers at a time (e.g., switchedUL on CC1 and CC2), concurrently transmit on the plurality of radio frequency carriers (e.g., dualUL on CC1 and CC2), transmit on a single radio frequency carrier of the second plurality of radio frequency carriers at a time (e.g., switchedUL on CC3 and CC4), concurrently transmit on the second plurality of radio frequency carriers (e.g., dualUL on CC3 and CC4), or a combination thereof.

In some examples, the user equipment may receive second scheduling information that schedules the user equipment for a second transmission at a first data rate during a second time slot, determine whether the first data rate is less than or equal to the peak uplink data rate, and selectively transmit the second transmission according to the determining whether the first data rate is less than or equal to the peak uplink data rate. In some examples, determining whether the first data rate is less than or equal to the peak uplink data rate may include determining that the first data rate is greater than the peak uplink data rate. In this case, selectively transmitting the second transmission may include abstaining from transmitting the second transmission. In some examples, determining whether the first data rate is less than or equal to the peak uplink data rate may include determining that the first data rate is less than or equal to the peak uplink data rate. In this case, selectively transmitting the second transmission may include transmitting the second transmission.

Figure 14:
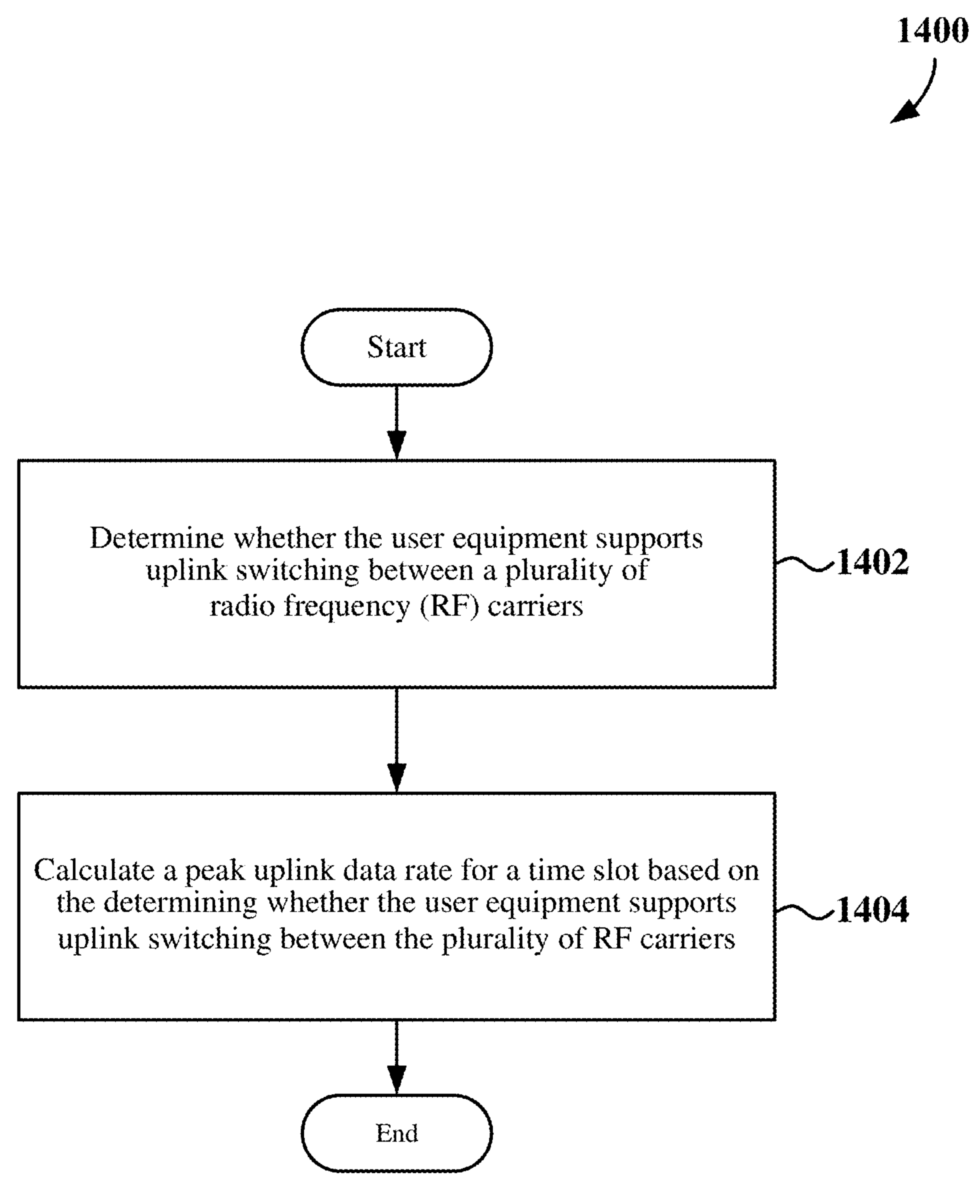
FIG. 14 is a flow chart of an example peak data rate calculation method according to some aspects.

FIG. 14 is a flow chart illustrating an example method 1400 for wireless communication according to some aspects. As described below, some or all illustrated features may be omitted in a particular implementation within the scope of the present disclosure, and some illustrated features may not be required for implementation of all examples. In some examples, the method 1400 may be carried out by the user equipment 1200 illustrated in FIG. 12 or by any suitable apparatus or means for carrying out the functions or algorithm described below.

At block 1402, a user equipment may determine whether the user equipment supports uplink switching between a plurality of radio frequency (RF) carriers. For example, the uplink configuration circuitry 1242, shown and described above in connection with FIG. 12, may provide a means to determine whether the user equipment supports uplink switching between a plurality of radio frequency (RF) carriers. In some examples, the uplink switching may be the UL Tx Switching discussed above.

At block 1404, the user equipment may calculate a peak uplink data rate for a time slot based on the determining whether the user equipment supports uplink switching between the plurality of RF carriers. For example, the data rate processing circuitry 1243, shown and described above in connection with FIG. 12, may provide a means to calculate a peak uplink data rate for a time slot based on the determining whether the user equipment supports uplink switching between the plurality of RF carriers. In some examples, the peak uplink data rate may be the Data Rate parameter discussed above.

In some examples, the user equipment may calculate the peak uplink data rate based on a maximum quantity of the plurality of RF carriers on which the user equipment can transmit during the time slot (e.g., 1 carrier for switchedUL and 2 carriers for dualUL). In some examples, the user equipment may determine the maximum quantity of the plurality of RF carriers based on whether the user equipment supports uplink transmission on a single RF carrier of the plurality of RF carriers at a time (e.g., switchedUL), concurrent uplink transmissions on the plurality of RF carriers (e.g., dualUL), or a combination thereof. In some examples, the user equipment may determine the maximum quantity of the plurality of RF carriers based on whether the user equipment further supports at least one fixed uplink RF carrier (e.g., CC3), wherein the user equipment does not support uplink switching between the at least one fixed uplink RF carrier and any other RF carrier. In some examples, the user equipment may determine the maximum quantity of the plurality of RF carriers based on whether the user equipment supports uplink switching between a first set of RF carriers of the plurality of RF carriers (e.g., CC1 and CC2) and between a second set of RF carriers of the plurality of RF carriers (e.g., CC3 and CC4).

In some examples, the user equipment may determine that the user equipment supports uplink transmission on a single RF carrier of the plurality of RF carriers at a time (e.g., switchedUL), identify a first RF carrier of the plurality of RF carriers that is associated with a highest peak uplink data rate of the plurality of RF carriers, and calculate the peak uplink data rate based on a quantity of layers supported by the user equipment for the first RF carrier.

In some examples, the user equipment may calculate a first peak uplink data rate for carrier aggregation on a first RF carrier of the plurality of RF carriers (e.g., calculate Data Rate for CA on CC1), calculate a second peak uplink data rate for concurrent transmissions on the first RF carrier and a second RF carrier of the plurality of RF carriers (e.g., calculate Data Rate for simultaneous Tx on CC1 and CC2), and select a highest peak uplink data rate from the first peak uplink data rate and the second peak uplink data rate to provide the peak uplink data rate for the time slot.

In some examples, the user equipment may determine a first constraint on a first maximum quantity of layers for a first RF carrier of the plurality of RF carriers (e.g., the $v_{Layers}$ constraint for CC1), determine a second constraint on a second maximum quantity of layers for a second RF carrier of the plurality of RF carriers (e.g., the $v_{Layers}$ constraint for CC2), determine a third constraint on a third maximum quantity of layers for the plurality of RF carriers (e.g., $\Sigma S_{Layers}$ constrained by 2 for dualUL or constrained by X), and calculate the peak uplink data rate for the time slot based on the first constraint, the second constraint, and the third constraint.

In some examples, the user equipment may determine that the user equipment supports concurrent uplink transmissions on the plurality of RF carriers (e.g., dualUL), determine a maximum quantity of layers supported by the user equipment for the concurrent uplink transmissions, calculate different peak uplink data rates for different combinations of the maximum quantity of layers across the plurality of RF carriers (e.g., calculate a $1^{st}$ peak rate for 1+1, calculate a $2^{nd}$ peak rate for 2+0), and select a highest peak uplink data rate of the different peak uplink data rates to provide the peak uplink data rate for the time slot.

In some examples, to determine the maximum quantity of layers, the user equipment may determine a first maximum quantity of layers for a particular RF carrier of the plurality of RF carriers as constrained by a first layer capability for the particular RF carrier (e.g., the $v_{Layers}$ constraint).

In some examples, to determine the maximum quantity of layers, the user equipment may determine a first maximum quantity of layers for a first RF carrier of the plurality of RF carriers as constrained by a first layer capability for the first RF carrier (e.g., the $v_{Layers}$ constraint for CC1), determine a second maximum quantity of layers for a second RF carrier of the plurality of RF carriers as constrained by a second layer capability for the second RF carrier (e.g., the $v_{Layers}$ constraint for CC2), sum the first maximum quantity of layers for the first RF carrier and the second maximum quantity of layers for the second RF carrier to provide a third maximum quantity of layers for the plurality of RF carriers (e.g., $\Sigma S_{Layers}$), and determine a final maximum quantity of layers based on the third maximum quantity of layers for the plurality of RF carriers as constrained by a maximum quantity of transmit chains of the user equipment (e.g., $\Sigma S_{Layers}$ constrained by 2 for dualUL or constrained by X).

In some examples, the user equipment may calculate a first peak uplink data rate for the plurality of RF carriers (e.g., CC1 and CC2), calculating a second peak uplink data rate for another RF carrier (e.g., CC3), and sum the first peak uplink data rate and the second peak uplink data rate to provide the peak uplink data rate for the time slot.

In some examples, the user equipment may calculate a first peak uplink data rate for carrier aggregation on a first RF carrier of the plurality of RF carriers (e.g., calculate Data Rate for CA on CC1), calculate a second peak uplink data rate for concurrent transmissions on the first RF carrier and a second RF carrier of the plurality of RF carriers (e.g., calculate Data Rate for simultaneous Tx on CC1 and CC2), select a highest peak uplink data rate for switched RF carriers from the first peak uplink data rate and the second peak uplink data rate (e.g., select the highest Data Rate for dualUL), calculate at least one third peak uplink data rate for at least one fixed uplink RF carrier (e.g., calculate Data Rate for CC3), wherein the user equipment does not support uplink switching between the at least one fixed uplink RF carrier and any other RF carrier, and sum the highest peak uplink data rate for switched RF carriers (e.g., the highest Data Rate for dualUL) and the at least one third peak uplink data rate for the at least one fixed uplink RF carrier (e.g., Data Rate for CC3) to provide the peak uplink data rate for the time slot.

In some examples, the user equipment may transmit a first indication that the user equipment supports at least one fixed uplink RF carrier (e.g., CC3), and the uplink switching between the plurality of RF carriers (e.g., UL Tx Switching). In some examples, the user equipment may receive a second indication that configures the user equipment to transmit on a single RF carrier of the plurality of RF carriers at a time (e.g., switchedUL), concurrently transmit on the plurality of RF carriers (e.g., dualUL), transmit on the at least one fixed uplink RF carrier, or a combination thereof.

In some examples, the user equipment may calculate a first peak uplink data rate for the plurality of RF carriers (e.g., calculate Data Rate for CC1 and CC2), calculate a second peak uplink data rate for a second plurality of RF carriers (e.g., calculate Data Rate for CC3 and CC4), and sum the first peak uplink data rate and the second peak uplink data rate to provide the peak uplink data rate for the time slot.

In some examples, the user equipment may calculate a first peak uplink data rate for carrier aggregation on a first RF carrier of the plurality of RF carriers (e.g., calculate Data Rate for CA on CC1), calculate a second peak uplink data rate for concurrent transmissions on the first RF carrier and a second RF carrier of the plurality of RF carriers (e.g., calculate Data Rate for simultaneous Tx on CC1 and CC2), select a highest peak uplink data rate for a first set of switched RF carriers (e.g., CC1 and CC2) from the first peak uplink data rate and the second peak uplink data rate, calculate a third peak uplink data rate for carrier aggregation on a third RF carrier of another plurality of RF carriers (e.g., calculate Data Rate for CA on CC3), calculate a fourth peak uplink data rate for concurrent transmissions on the third RF carrier and a further RF carrier of the other plurality of RF carriers (e.g., calculate Data Rate for simultaneous Tx on CC3 and CC4), select another highest peak uplink data rate for a second set of switched RF carriers (e.g., CC3 and CC4) from the third peak uplink data rate and the fourth peak uplink data rate, and sum the highest peak uplink data rate for the first set of switched RF carriers (e.g., CC1 and CC2) and the other highest peak uplink data rate for the second set of switched RF carriers (e.g., CC3 and CC4) to provide the peak uplink data rate for the time slot.

In some examples, the user equipment may transmit a first indication that the user equipment supports the uplink switching between the plurality of RF carriers (e.g., UL Tx Switching on CC1 and CC2), and uplink switching between a second plurality of RF carriers (e.g., UL Tx Switching on CC3 and CC4). In some examples, the user equipment may receive a second indication that configures the user equipment to transmit on a single RF carrier of the plurality of RF carriers at a time (e.g., switchedUL on CC1 and CC2), concurrently transmit on the plurality of RF carriers (e.g., dualUL on CC1 and CC2), transmit on a single RF carrier of the second plurality of RF carriers at a time (e.g., switchedUL on CC3 and CC4), concurrently transmit on the second plurality of RF carriers (e.g., dualUL on CC3 and CC4), or a combination thereof.

In some examples, the user equipment may receive scheduling information that schedules the user equipment for an uplink transmission at a first data rate during the time slot, determine whether the first data rate is less than or equal to the peak uplink data rate, and selectively transmit the uplink transmission according to the determining whether the first data rate is less than or equal to the peak uplink data rate. In some examples, determining whether the first data rate is less than or equal to the peak uplink data rate may include determining that the first data rate is greater than the peak uplink data rate. In this case, selectively transmitting the uplink transmission may include abstaining from transmitting the uplink transmission. In some examples, determining whether the first data rate is less than or equal to the peak uplink data rate may include determining that the first data rate is less than or equal to the peak uplink data rate. In this case, selectively transmitting the uplink transmission may include transmitting the uplink transmission.

In some examples, a method of wireless communication at a user equipment may include determining whether the user equipment supports uplink switching between a plurality of radio frequency (RF) carriers and calculating a peak uplink data rate for a time slot based on the determining whether the user equipment supports uplink switching between the plurality of RF carriers.

In some examples, a user equipment may include a transceiver, a memory, and a processor communicatively coupled to the transceiver and the memory. The processor and the memory may be configured to determine whether the user equipment supports uplink switching between a plurality of radio frequency (RF) carriers and calculate a peak uplink data rate for a time slot based on the determining whether the user equipment supports uplink switching between the plurality of RF carriers.

In some examples, a user equipment may include means for determining whether the user equipment supports uplink switching between a plurality of radio frequency (RF) carriers and means for calculating a peak uplink data rate for a time slot based on the determining whether the user equipment supports uplink switching between the plurality of RF carriers.

In some examples, an article of manufacture for use by a user equipment includes a non-transitory computer-readable medium having stored therein instructions executable by one or more processors of the user equipment to determine whether the user equipment supports uplink switching between a plurality of radio frequency (RF) carriers and calculate a peak uplink data rate for a time slot based on the determining whether the user equipment supports uplink switching between the plurality of RF carriers.

In one configuration, the user equipment 1200 includes means for receiving scheduling information for a transmission on at least one radio frequency carrier of a plurality of radio frequency carriers, and means for transmitting the transmission on the at least one radio frequency carrier according to a peak uplink data rate for a time slot, wherein the peak uplink data rate is based on whether the user equipment supports uplink switching between the plurality of radio frequency carriers. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 4, 5, 11, and 12, and utilizing, for example, the methods and/or algorithms described herein in relation to FIGS. 13 and 14.

Figure 15:
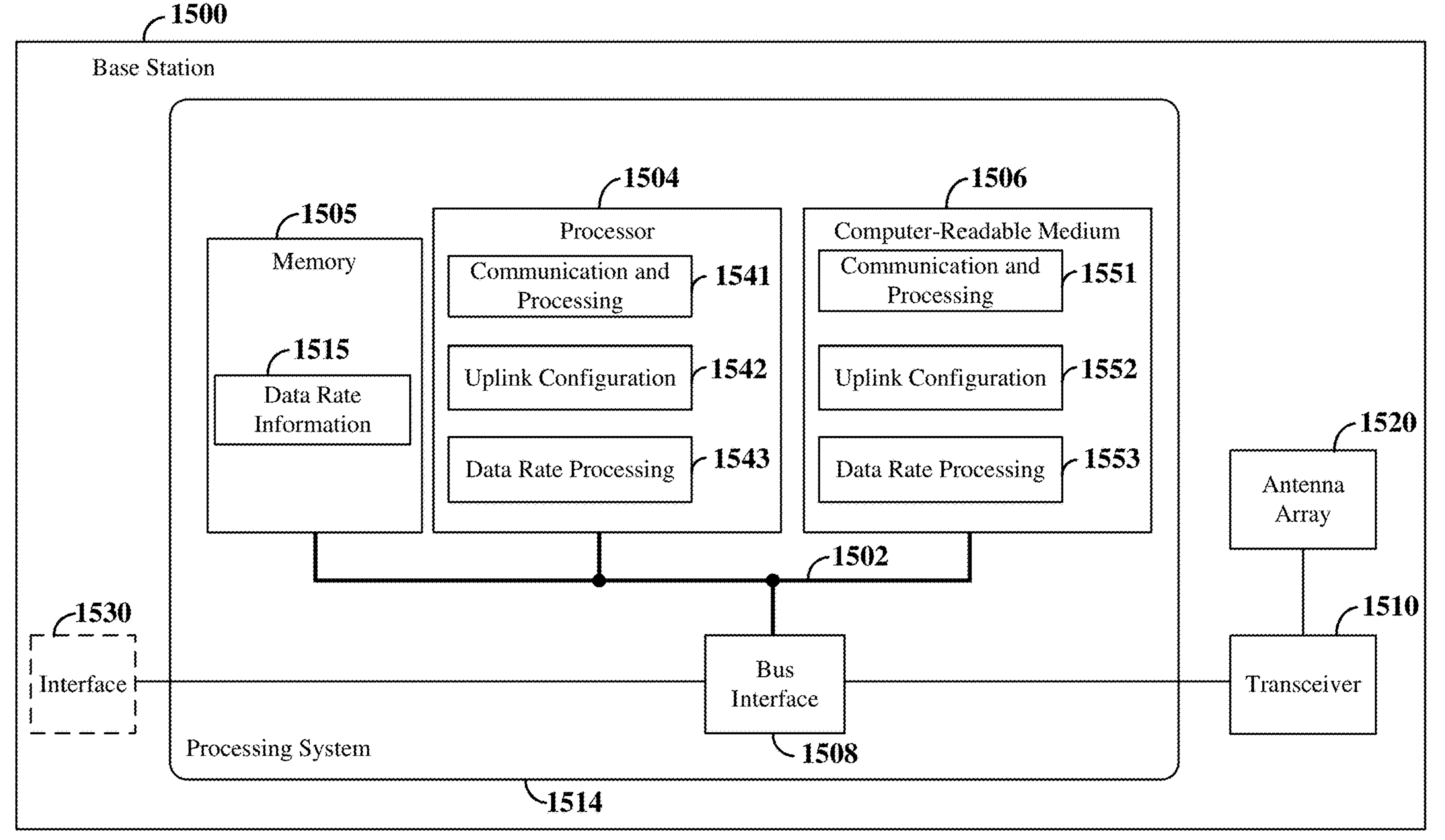
FIG. 15 is a block diagram conceptually illustrating an example of a hardware implementation for a base station employing a processing system according to some aspects.

FIG. 15 is a conceptual diagram illustrating an example of a hardware implementation for a base station 1500 employing a processing system 1514. In some implementations, the base station 1500 may correspond to any of the base stations (e.g., gNBs) or scheduling entities as illustrated in any of FIGS. 1, 2, 4, 5, and 11.

In accordance with various aspects of the disclosure, an element, or any portion of an element, or any combination of elements may be implemented with the processing system 1514. The processing system may include one or more processors 1504. The processing system 1514 may be substantially the same as the processing system 1214 illustrated in FIG. 12, including a bus interface 1508, a bus 1502, memory 1505, a processor 1504, a transceiver 1510, an antenna array 1520, and a computer-readable medium 1506. The memory 1505 may include data rate information 1515 (e.g., associated with uplink switching) that may be used by the processor 1504 for reception operations as discussed herein. Furthermore, the base station 1500 may include an interface 1530 (e.g., a network interface) that provides a means for communicating with at least one other apparatus within a core network and with at least one radio access network.

The base station 1500 may be configured to perform any one or more of the operations described herein (e.g., as described above in conjunction with FIGS. 1-11 and as described below in conjunction with FIGS. 16-17). In some aspects of the disclosure, the processor 1504, as utilized in the base station 1500, may include circuitry configured for various functions.

The processor 1504 may be configured to generate, schedule, and modify a resource assignment or grant of time-frequency resources (e.g., a set of one or more resource elements). For example, the processor 1504 may schedule time-frequency resources within a plurality of time division duplex (TDD) and/or frequency division duplex (FDD) subframes, slots, and/or mini-slots to carry user data traffic and/or control information to and/or from multiple UEs.

In some aspects of the disclosure, the processor 1504 may include communication and processing circuitry 1541. The communication and processing circuitry 1544 may be configured to communicate with a UE. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

The communication and processing circuitry 1541 may further be configured to receive messages from a UE. For example, the messages may be included in a MAC-CE carried in a PUSCH, or included in a RRC message, or included in a dedicated PUCCH or PUSCH. The communication and processing circuitry 1541 may further be configured to receive a scheduling request from a UE for an uplink grant.

In some implementations wherein the communication involves receiving information, the communication and processing circuitry 1541 may obtain information from a component of the base station 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations wherein the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding.

The processor 1504 may include uplink configuration circuitry 1542 configured to perform uplink configuration-related operations as discussed herein. The uplink configuration circuitry 1542 may be configured to execute uplink configuration software 1552 included on the computer-readable medium 1506 to implement one or more functions described herein.

The uplink configuration circuitry 1542 may include functionality for a means for determining whether a user equipment supports uplink switching. For example, the uplink configuration circuitry 1542 may be configured to receive UE capability information (e.g., BandCombination-List-UplinkTxSwitch capability information) from a UE and process the information to determine, for example, whether the UE is configured for (or has reported a capability of supporting) a switchedUL mode of operation or a dualUL mode of operation as discussed above.

The uplink configuration circuitry 1542 may include functionality for a means for transmitting scheduling information to a user equipment, wherein the scheduling information schedules a transmission by the user equipment on at least one radio frequency carrier of a plurality of radio frequency carriers. For example, the uplink configuration circuitry 1542 may be configured to transmit a scheduling message (e.g., a DCI, etc.) to a UE on a channel (e.g., a PDCCH) allocated for the UE, where the scheduling message identifies the resources allocated by the base station 1500 for an uplink transmission by the UE.

The processor 1504 may include data rate processing circuitry 1543 configured to perform data rate processing-related operations as discussed herein. The data rate processing circuitry 1543 may be configured to execute data rate processing software 1553 included on the computer-readable medium 1506 to implement one or more functions described herein.

The data rate processing circuitry 1543 may include functionality for a means for calculating a peak uplink data rate. For example, the data rate processing circuitry 1543 may be configured to calculate a peak uplink data rate that will be used by a UE, where the peak uplink data rate is calculated based on whether the UE supports UL transmit switching as discussed above in conjunction with FIG. 8.

The data rate processing circuitry 1543 may include functionality for a means for receiving a transmission from the user equipment on the at least one radio frequency carrier according to a peak uplink data rate for a time slot, where the peak uplink data rate is calculated based on whether the user equipment supports uplink switching between the plurality of radio frequency carriers. For example, the data rate processing circuitry 1543 may be configured to cause the communication and processing circuitry 1541 to receive an UL transmission on resources (e.g., a PUSCH) allocated for a UE.

Figure 16:
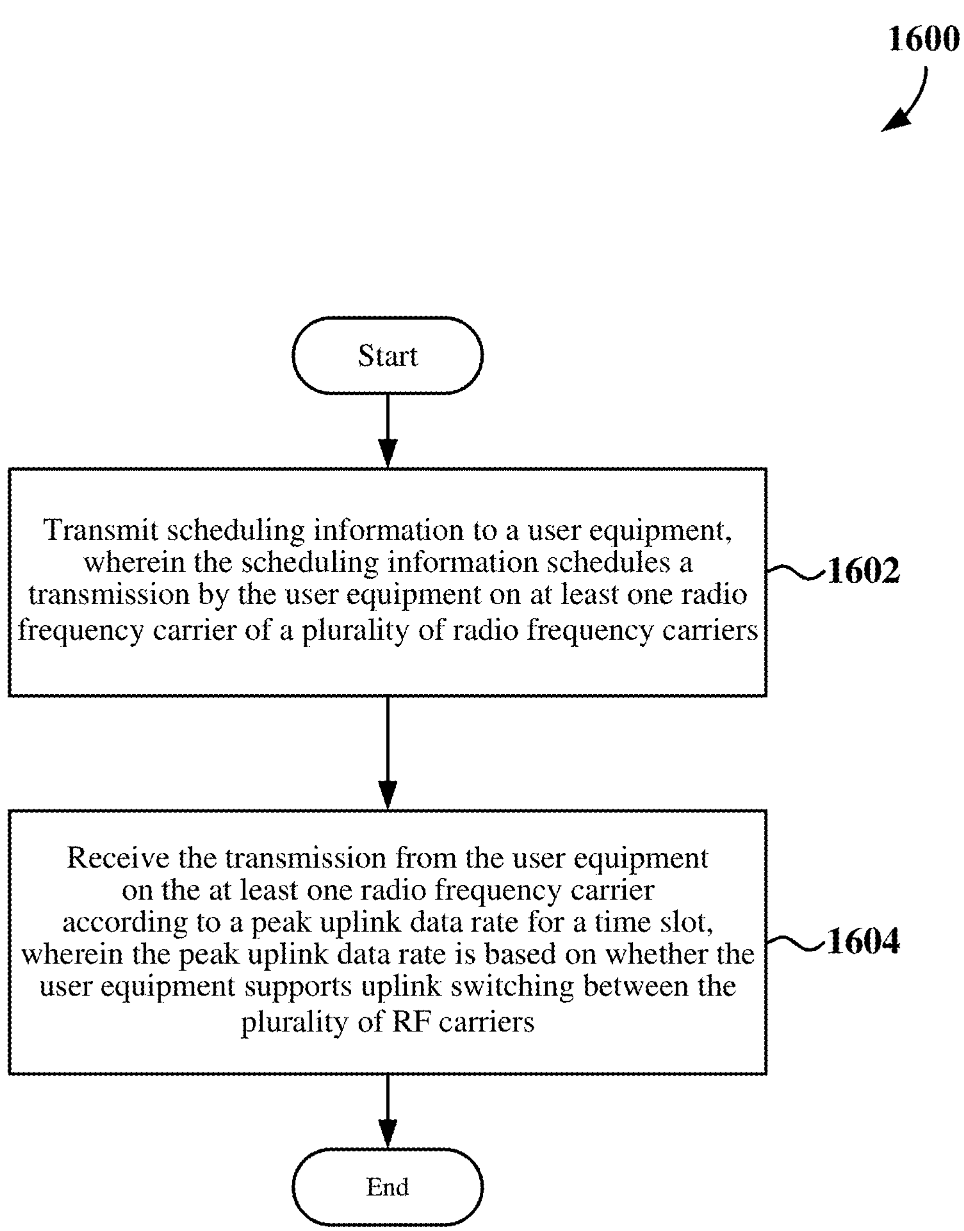
FIG. 16 is a flow chart of an example communication method according to some aspects.

FIG. 16 is a flow chart illustrating an example method 1600 for wireless communication according to some aspects. As described below, some or all illustrated features may be omitted in a particular implementation within the scope of the present disclosure, and some illustrated features may not be required for implementation of all examples. In some examples, the method 1600 may be carried out by the base station 1500 illustrated in FIG. 15 or by any suitable apparatus or means for carrying out the functions or algorithm described below.

At block 1602, a base station may transmit scheduling information to a user equipment, wherein the scheduling information schedules a transmission by the user equipment on at least one radio frequency carrier of a plurality of radio frequency carriers. For example, the uplink configuration circuitry 1542 together with the communication and processing circuitry 1541 and the transceiver 1510, shown and described above in connection with FIG. 15, may provide a means to transmit scheduling information to a user equipment, wherein the scheduling information schedules a transmission by the user equipment on at least one radio frequency carrier of a plurality of radio frequency carriers. In some examples, the plurality of radio frequency carriers may correspond to a plurality of multiple-input-multiple-output (MIMO) layers.

At block 1604, the base station may receive the transmission from the user equipment on the at least one radio frequency carrier according to a peak uplink data rate for a time slot, wherein the peak uplink data rate is based on whether the user equipment supports uplink switching between the plurality of radio frequency carriers. For example, the data rate processing circuitry 1543 together with the communication and processing circuitry 1541 and the transceiver 1510, shown and described above in connection with FIG. 15, may provide a means to receive the transmission from the user equipment on the at least one radio frequency carrier according to a peak uplink data rate for a time slot, wherein the peak uplink data rate is based on whether the user equipment supports uplink switching between the plurality of radio frequency carriers. In some examples, the peak uplink data rate may be the Data Rate parameter discussed above. In some examples, the uplink switching may be the UL Tx Switching discussed above.

In some examples, the base station may calculate the peak uplink data rate based on a maximum quantity of the plurality of radio frequency carriers on which the user equipment can transmit during the time slot (e.g., 1 carrier for switchedUL and 2 carriers for dualUL). In some examples, the base station may determine the maximum quantity of the plurality of radio frequency carriers based on whether the user equipment supports uplink transmission on a single radio frequency carrier of the plurality of radio frequency carriers at a time (e.g., switchedUL), concurrent uplink transmissions on the plurality of radio frequency carriers (e.g., dualUL), or a combination thereof. In some examples, the base station may determine the maximum quantity of the plurality of radio frequency carriers based on whether the user equipment further supports at least one fixed uplink radio frequency carrier (e.g., CC3), wherein the user equipment does not support uplink switching between the at least one fixed uplink radio frequency carrier and any other radio frequency carrier. In some examples, the base station may determine the maximum quantity of the plurality of radio frequency carriers based on whether the user equipment supports uplink switching between a first set of radio frequency carriers of the plurality of radio frequency carriers (e.g., CC1 and CC2) and between a second set of radio frequency carriers of the plurality of radio frequency carriers (e.g., CC3 and CC4).

In some examples, the base station may determine that the user equipment supports uplink transmission on a single radio frequency carrier of the plurality of radio frequency carriers at a time (e.g., switchedUL), identify a first radio frequency carrier of the plurality of radio frequency carriers that is associated with a highest peak uplink data rate of the plurality of radio frequency carriers, and calculate the peak uplink data rate based on a quantity of layers supported by the user equipment for the first radio frequency carrier.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), and select a highest peak uplink data rate from the first peak uplink data rate and the second peak uplink data rate to provide the peak uplink data rate for the time slot.

In some examples, the base station may determine a first constraint on a first maximum quantity of layers for a first radio frequency carrier of the plurality of radio frequency carriers (e.g., the $v_{Layers}$ constraint for CC1), determine a second constraint on a second maximum quantity of layers for a second radio frequency carrier of the plurality of radio frequency carriers (e.g., the $v_{Layers}$ constraint for CC2), determine a third constraint on a third maximum quantity of layers for the plurality of radio frequency carriers (e.g., $\Sigma S_{Layers}$ constrained by 2 for dualUL or constrained by X), and calculate the peak uplink data rate for the time slot based on the first constraint, the second constraint, and the third constraint.

In some examples, the base station may determine that the user equipment supports concurrent uplink transmissions on the plurality of radio frequency carriers (e.g., dualUL), determine a maximum quantity of layers supported by the user equipment for the concurrent uplink transmissions, calculate different peak uplink data rates for different combinations of the maximum quantity of layers across the plurality of radio frequency carriers (e.g., calculate a $1^{st}$ peak rate for 1+1, calculate a $2^{nd}$ peak rate for 2+0), and select a highest peak uplink data rate of the different peak uplink data rates to provide the peak uplink data rate for the time slot.

In some examples, to determine the maximum quantity of layers, the base station may determine a first maximum quantity of layers for a particular radio frequency carrier of the plurality of radio frequency carriers as constrained by a first layer capability for the particular radio frequency carrier (e.g., the $v_{Layers}$ constraint).

In some examples, to determine the maximum quantity of layers, the base station may determine a first maximum quantity of layers for a first radio frequency carrier of the plurality of radio frequency carriers as constrained by a first layer capability for the first radio frequency carrier (e.g., the $v_{Layers}$ constraint for CC1), determine a second maximum quantity of layers for a second radio frequency carrier of the plurality of radio frequency carriers as constrained by a second layer capability for the second radio frequency carrier (e.g., the $v_{Layers}$ constraint for CC2), sum the first maximum quantity of layers for the first radio frequency carrier and the second maximum quantity of layers for the second radio frequency carrier to provide a third maximum quantity of layers for the plurality of radio frequency carriers (e.g., $\Sigma S_{Layers}$), and determine a final maximum quantity of layers based on the third maximum quantity of layers for the plurality of radio frequency carriers as constrained by a maximum quantity of transmit chains of the user equipment (e.g., $\Sigma S_{Layers}$ constrained by 2 for dualUL or constrained by X).

In some examples, the base station may calculate a first peak uplink data rate for the plurality of radio frequency carriers (e.g., CC1 and CC2), calculate a second peak uplink data rate for another radio frequency carrier (e.g., CC3), and sum the first peak uplink data rate and the second peak uplink data rate to provide the peak uplink data rate for the time slot.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for switched radio frequency carriers from the first peak uplink data rate and the second peak uplink data rate (e.g., select the highest Data Rate for dualUL), calculate at least one third peak uplink data rate for at least one fixed uplink radio frequency carrier (e.g., calculate Data Rate for CC3), wherein the user equipment does not support uplink switching between the at least one fixed uplink radio frequency carrier and any other radio frequency carrier, and sum the highest peak uplink data rate for switched radio frequency carriers (e.g., the highest Data Rate for dualUL) and the at least one third peak uplink data rate for the at least one fixed uplink radio frequency carrier (e.g., Data Rate for CC3) to provide the peak uplink data rate for the time slot.

In some examples, the base station may receive a first indication that the user equipment supports at least one fixed uplink radio frequency carrier (e.g., CC3), and the uplink switching between the plurality of radio frequency carriers (e.g., UL Tx Switching). In some examples, the base station may transmit a second indication that configures the user equipment to transmit on a single radio frequency carrier of the plurality of radio frequency carriers at a time (e.g., switchedUL), concurrently transmit on the plurality of radio frequency carriers (e.g., dualUL), transmit on the at least one fixed uplink radio frequency carrier, or a combination thereof.

In some examples, the base station may calculate a first peak uplink data rate for the plurality of radio frequency carriers (e.g., calculate Data Rate for CC1 and CC2), calculate a second peak uplink data rate for a second plurality of radio frequency carriers (e.g., calculate Data Rate for CC3 and CC4), and sum the first peak uplink data rate and the second peak uplink data rate to provide the peak uplink data rate for the time slot.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for a first set of switched radio frequency carriers (e.g., CC1 and CC2) from the first peak uplink data rate and the second peak uplink data rate, calculate a third peak uplink data rate for carrier aggregation on a third radio frequency carrier of another plurality of radio frequency carriers (e.g., calculate Data Rate for CA on CC3), calculate a fourth peak uplink data rate for concurrent transmissions on the third radio frequency carrier and a further radio frequency carrier of the other plurality of radio frequency carriers (e.g., calculate Data Rate for simultaneous Tx on CC3 and CC4), select another highest peak uplink data rate for a second set of switched radio frequency carriers (e.g., CC3 and CC4) from the third peak uplink data rate and the fourth peak uplink data rate, and sum the highest peak uplink data rate for the first set of switched radio frequency carriers (e.g., CC1 and CC2) and the other highest peak uplink data rate for the second set of switched radio frequency carriers (e.g., CC3 and CC4) to provide the peak uplink data rate for the time slot.

In some examples, the base station may receive a first indication that the user equipment supports the uplink switching between the plurality of radio frequency carriers (e.g., UL Tx Switching on CC1 and CC2), and uplink switching between a second plurality of radio frequency carriers (e.g., UL Tx Switching on CC3 and CC4). In some examples, the base station may transmit a second indication that configures the user equipment to transmit on a single radio frequency carrier of the plurality of radio frequency carriers at a time (e.g., switchedUL on CC1 and CC2), concurrently transmit on the plurality of radio frequency carriers (e.g., dualUL on CC1 and CC2), transmit on a single radio frequency carrier of the second plurality of radio frequency carriers at a time (e.g., switchedUL on CC3 and CC4), concurrently transmit on the second plurality of radio frequency carriers (e.g., dualUL on CC3 and CC4), or a combination thereof.

In some examples, the base station may transmit second scheduling information that schedules the user equipment for a second transmission at a first data rate during a second time slot, determine whether the first data rate is less than or equal to the peak uplink data rate, and selectively receive the second transmission according to the determining whether the first data rate is less than or equal to the peak uplink data rate. In some examples, determining whether the first data rate is less than or equal to the peak uplink data rate may include determining that the first data rate is greater than the peak uplink data rate. In this case, selectively receiving the second transmission may include abstaining from receiving the second transmission. In some examples, determining whether the first data rate is less than or equal to the peak uplink data rate may include determining that the first data rate is less than or equal to the peak uplink data rate. In this case, selectively receiving the second transmission may include receiving the second transmission.

Figure 17:
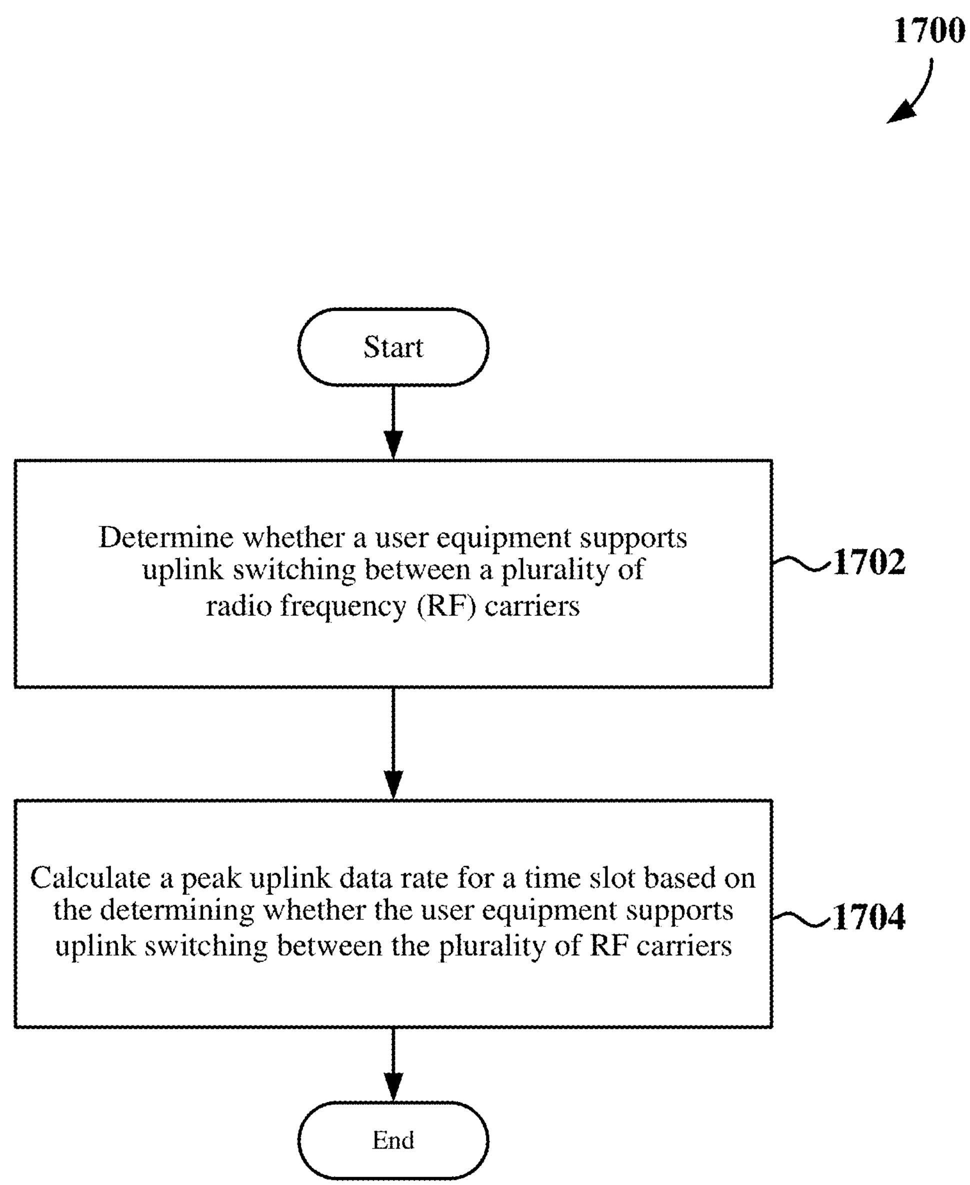
FIG. 17 is a flow chart of an example peak data rate calculation method according to some aspects.

FIG. 17 is a flow chart illustrating an example method 1700 for wireless communication according to some aspects. As described below, some or all illustrated features may be omitted in a particular implementation within the scope of the present disclosure, and some illustrated features may not be required for implementation of all examples. In some examples, the method 1700 may be carried out by the base station 1500 illustrated in FIG. 15 or by any suitable apparatus or means for carrying out the functions or algorithm described below.

At block 1702, a base station may determine whether a user equipment supports uplink switching between a plurality of radio frequency (RF) carriers. For example, the uplink configuration circuitry 1542, shown and described above in connection with FIG. 15, may provide a means to determine whether a user equipment supports uplink switching between a plurality of radio frequency (RF) carriers. In some examples, the uplink switching may be the UL Tx Switching discussed above.

At block 1704, the base station may calculate a peak uplink data rate for a time slot based on the determining whether the user equipment supports uplink switching between the plurality of RF carriers. For example, the data rate processing circuitry 1543, shown and described above in connection with FIG. 15, may provide a means to calculate a peak uplink data rate for a time slot based on the determining whether the user equipment supports uplink switching between the plurality of RF carriers. In some examples, the peak uplink data rate may be the Data Rate parameter discussed above.

In some examples, the base station may calculate the peak uplink data rate based on a maximum quantity of the plurality of radio frequency carriers on which the user equipment can transmit during the time slot (e.g., 1 carrier for switchedUL and 2 carriers for dualUL). In some examples, the base station may determine the maximum quantity of the plurality of radio frequency carriers based on whether the user equipment supports uplink transmission on a single radio frequency carrier of the plurality of radio frequency carriers at a time (e.g., switchedUL), concurrent uplink transmissions on the plurality of radio frequency carriers (e.g., dualUL), or a combination thereof. In some examples, the base station may determine the maximum quantity of the plurality of radio frequency carriers based on whether the user equipment further supports at least one fixed uplink radio frequency carrier (e.g., CC3), wherein the user equipment does not support uplink switching between the at least one fixed uplink radio frequency carrier and any other radio frequency carrier. In some examples, the base station may determine the maximum quantity of the plurality of radio frequency carriers based on whether the user equipment supports uplink switching between a first set of radio frequency carriers of the plurality of radio frequency carriers (e.g., CC1 and CC2) and between a second set of radio frequency carriers of the plurality of radio frequency carriers (e.g., CC3 and CC4).

In some examples, the base station may determine that the user equipment supports uplink transmission on a single radio frequency carrier of the plurality of radio frequency carriers at a time (e.g., switchedUL), identify a first radio frequency carrier of the plurality of radio frequency carriers that is associated with a highest peak uplink data rate of the plurality of radio frequency carriers, and calculate the peak uplink data rate based on a quantity of layers supported by the user equipment for the first radio frequency carrier.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), and select a highest peak uplink data rate from the first peak uplink data rate and the second peak uplink data rate to provide the peak uplink data rate for the time slot.

In some examples, the base station may determine a first constraint on a first maximum quantity of layers for a first radio frequency carrier of the plurality of radio frequency carriers (e.g., the $v_{Layers}$ constraint for CC1), determine a second constraint on a second maximum quantity of layers for a second radio frequency carrier of the plurality of radio frequency carriers (e.g., the $v_{Layers}$ constraint for CC2), determine a third constraint on a third maximum quantity of layers for the plurality of radio frequency carriers (e.g., $\Sigma S_{Layers}$ constrained by 2 for dualUL or constrained by X), and calculate the peak uplink data rate for the time slot based on the first constraint, the second constraint, and the third constraint.

In some examples, the base station may determine that the user equipment supports concurrent uplink transmissions on the plurality of radio frequency carriers (e.g., dualUL), determine a maximum quantity of layers supported by the user equipment for the concurrent uplink transmissions, calculate different peak uplink data rates for different combinations of the maximum quantity of layers across the plurality of radio frequency carriers (e.g., calculate a 1st peak rate for 1+1, calculate a 2nd peak rate for 2+0), and select a highest peak uplink data rate of the different peak uplink data rates to provide the peak uplink data rate for the time slot.

In some examples, to determine the maximum quantity of layers, the base station may determine a first maximum quantity of layers for a particular radio frequency carrier of the plurality of radio frequency carriers as constrained by a first layer capability for the particular radio frequency carrier (e.g., the $v_{Layers}$ constraint).

In some examples, to determine the maximum quantity of layers, the base station may determine a first maximum quantity of layers for a first radio frequency carrier of the plurality of radio frequency carriers as constrained by a first layer capability for the first radio frequency carrier (e.g., the $v_{Layers}$ constraint for CC1), determine a second maximum quantity of layers for a second radio frequency carrier of the plurality of radio frequency carriers as constrained by a second layer capability for the second radio frequency carrier (e.g., the $v_{Layers}$ constraint for CC2), sum the first maximum quantity of layers for the first radio frequency carrier and the second maximum quantity of layers for the second radio frequency carrier to provide a third maximum quantity of layers for the plurality of radio frequency carriers (e.g., $\Sigma S_{Layers}$), and determine a final maximum quantity of layers based on the third maximum quantity of layers for the plurality of radio frequency carriers as constrained by a maximum quantity of transmit chains of the user equipment (e.g., $\Sigma S_{Layers}$ constrained by 2 for dualUL or constrained by X).

In some examples, the base station may calculate a first peak uplink data rate for the plurality of radio frequency carriers (e.g., CC1 and CC2), calculate a second peak uplink data rate for another radio frequency carrier (e.g., CC3), and sum the first peak uplink data rate and the second peak uplink data rate to provide the peak uplink data rate for the time slot.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for switched radio frequency carriers from the first peak uplink data rate and the second peak uplink data rate (e.g., select the highest Data Rate for dualUL), calculate at least one third peak uplink data rate for at least one fixed uplink radio frequency carrier (e.g., calculate Data Rate for CC3), wherein the user equipment does not support uplink switching between the at least one fixed uplink radio frequency carrier and any other radio frequency carrier, and sum the highest peak uplink data rate for switched radio frequency carriers (e.g., the highest Data Rate for dualUL) and the at least one third peak uplink data rate for the at least one fixed uplink radio frequency carrier (e.g., Data Rate for CC3) to provide the peak uplink data rate for the time slot.

In some examples, the base station may receive a first indication that the user equipment supports at least one fixed uplink radio frequency carrier (e.g., CC3), and the uplink switching between the plurality of radio frequency carriers (e.g., UL Tx Switching). In some examples, the base station may transmit a second indication that configures the user equipment to transmit on a single radio frequency carrier of the plurality of radio frequency carriers at a time (e.g., switchedUL), concurrently transmit on the plurality of radio frequency carriers (e.g., dualUL), transmit on the at least one fixed uplink radio frequency carrier, or a combination thereof.

In some examples, the base station may calculate a first peak uplink data rate for the plurality of radio frequency carriers (e.g., calculate Data Rate for CC1 and CC2), calculate a second peak uplink data rate for a second plurality of radio frequency carriers (e.g., calculate Data Rate for CC3 and CC4), and sum the first peak uplink data rate and the second peak uplink data rate to provide the peak uplink data rate for the time slot.

In some examples, the base station may calculate a first peak uplink data rate for carrier aggregation on a first radio frequency carrier of the plurality of radio frequency carriers (e.g., calculate Data Rate for CA on CC1), calculate a second peak uplink data rate for concurrent transmissions on the first radio frequency carrier and a second radio frequency carrier of the plurality of radio frequency carriers (e.g., calculate Data Rate for simultaneous Tx on CC1 and CC2), select a highest peak uplink data rate for a first set of switched radio frequency carriers (e.g., CC1 and CC2) from the first peak uplink data rate and the second peak uplink data rate, calculate a third peak uplink data rate for carrier aggregation on a third radio frequency carrier of another plurality of radio frequency carriers (e.g., calculate Data Rate for CA on CC3), calculate a fourth peak uplink data rate for concurrent transmissions on the third radio frequency carrier and a further radio frequency carrier of the other plurality of radio frequency carriers (e.g., calculate Data Rate for simultaneous Tx on CC3 and CC4), select another highest peak uplink data rate for a second set of switched radio frequency carriers (e.g., CC3 and CC4) from the third peak uplink data rate and the fourth peak uplink data rate, and sum the highest peak uplink data rate for the first set of switched radio frequency carriers (e.g., CC1 and CC2) and the other highest peak uplink data rate for the second set of switched radio frequency carriers (e.g., CC3 and CC4) to provide the peak uplink data rate for the time slot.

In some examples, the base station may receive a first indication that the user equipment supports the uplink switching between the plurality of radio frequency carriers (e.g., UL Tx Switching on CC1 and CC2), and uplink switching between a second plurality of radio frequency carriers (e.g., UL Tx Switching on CC3 and CC4). In some examples, the base station may transmit a second indication that configures the user equipment to transmit on a single radio frequency carrier of the plurality of radio frequency carriers at a time (e.g., switchedUL on CC1 and CC2), concurrently transmit on the plurality of radio frequency carriers (e.g., dualUL on CC1 and CC2), transmit on a single radio frequency carrier of the second plurality of radio frequency carriers at a time (e.g., switchedUL on CC3 and CC4), concurrently transmit on the second plurality of radio frequency carriers (e.g., dualUL on CC3 and CC4), or a combination thereof.

In some examples, the base station may transmit scheduling information that schedules the user equipment for an uplink transmission at a first data rate during the time slot, determine whether the first data rate is less than or equal to the peak uplink data rate, and selectively receive the uplink transmission according to the determining whether the first data rate is less than or equal to the peak uplink data rate. In some examples, determining whether the first data rate is less than or equal to the peak uplink data rate may include determining that the first data rate is greater than the peak uplink data rate. In this case, selectively receiving the uplink transmission may include abstaining from receiving the uplink transmission. In some examples, determining whether the first data rate is less than or equal to the peak uplink data rate may include determining that the first data rate is less than or equal to the peak uplink data rate. In this case, selectively receiving the uplink transmission may include receiving the uplink transmission.

In one configuration, the base station 1500 includes means for transmitting scheduling information to a user equipment, wherein the scheduling information schedules a transmission by the user equipment on at least one radio frequency carrier of a plurality of radio frequency carriers, and means for receiving the transmission from the user equipment on the at least one radio frequency carrier according to a peak uplink data rate for a time slot, wherein the peak uplink data rate is based on whether the user equipment supports uplink switching between the plurality of radio frequency carriers. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1, 2, 4, 5, 11, and 15, and utilizing, for example, the methods and/or algorithms described herein in relation to FIGS. 16 and 17.

The methods shown in FIGS. 13-14 and 16-17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving scheduling information for a transmission on at least one radio frequency carrier of a plurality of radio frequency carriers; and transmitting the transmission on the at least one radio frequency carrier according to a peak uplink data rate for a time slot, wherein the peak uplink data rate is based on whether the user equipment supports uplink switching between the plurality of radio frequency carriers.

Aspect 2: The method of aspect 1, further comprising: calculating the peak uplink data rate based on a maximum quantity of the plurality of radio frequency carriers on which the user equipment can transmit during the time slot.

Aspect 3: The method of aspect 1 or 2, wherein the plurality of radio frequency carriers correspond to a plurality of multiple-input-multiple-output (MIMO) layers.

Aspect 4: The method of any of aspects 1 through 3, further comprising: determining the maximum quantity of the plurality of radio frequency carriers based on whether the user equipment supports: an uplink transmission on a single radio frequency carrier of the plurality of radio frequency carriers at a time, concurrent uplink transmissions on the plurality of radio frequency carriers, or a combination thereof.

Aspect 5: The method of any of aspects 1 through 3 further comprising: determining the maximum quantity of the plurality of radio frequency carriers based on whether the user equipment supports at least one fixed uplink radio frequency carrier, wherein the user equipment does not support uplink switching between the at least one fixed uplink radio frequency carrier and any other radio frequency carrier.

Aspect 6: The method of any of aspects 1 through 3, further comprising: determining the maximum quantity of the plurality of radio frequency carriers based on whether the user equipment supports uplink switching between a first set of radio frequency carriers of the plurality of radio frequency carriers and between a second set of radio frequency carriers of the plurality of radio frequency carriers.

Aspect 7: The method of any of aspects 1 through 3 and 5, further comprising: determining that the user equipment supports an uplink transmission on a single radio frequency carrier of the plurality of radio frequency carriers at a time; identifying a first radio frequency carrier of the plurality of radio frequency carriers that is associated with a highest peak uplink data rate of the plurality of radio frequency carriers; and calculating the peak uplink data rate based on a quantity of layers supported by the user equipment for the first radio frequency carrier.

Aspect 8: The method of any of aspects 1 through 3 and 6, further comprising: calculating a first peak uplink data rate for carrier aggregation on a first radio frequency carrier of the plurality of radio frequency carriers; calculating a second peak uplink data rate for concurrent transmissions on the first radio frequency carrier and a second radio frequency carrier of the plurality of radio frequency carriers; and selecting a highest peak uplink data rate from the first peak uplink data rate and the second peak uplink data rate to provide the peak uplink data rate for the time slot.

Aspect 9: The method of any of aspects 1 through 3 and 6, further comprising: determining a first constraint on a first maximum quantity of layers for a first radio frequency carrier of the plurality of radio frequency carriers; determining a second constraint on a second maximum quantity of layers for a second radio frequency carrier of the plurality of radio frequency carriers; determining a third constraint on a third maximum quantity of layers for the plurality of radio frequency carriers; and calculating the peak uplink data rate for the time slot based on the first constraint, the second constraint, and the third constraint.

Aspect 10: The method of any of aspects 1 through 3 and 6, further comprising: determining that the user equipment supports concurrent uplink transmissions on the plurality of radio frequency carriers; determining a maximum quantity of layers supported by the user equipment for the concurrent uplink transmissions; calculating different peak uplink data rates for different combinations of the maximum quantity of layers across the plurality of radio frequency carriers; and selecting a highest peak uplink data rate of the different peak uplink data rates to provide the peak uplink data rate for the time slot.

Aspect 11: The method of aspect 10, further comprising: determining a first maximum quantity of layers for a particular radio frequency carrier of the plurality of radio frequency carriers as constrained by a first layer capability for the particular radio frequency carrier.

Aspect 12: The method of aspect 10, further comprising: determining a first maximum quantity of layers for a first radio frequency carrier of the plurality of radio frequency carriers as constrained by a first layer capability for the first radio frequency carrier; determining a second maximum quantity of layers for a second radio frequency carrier of the plurality of radio frequency carriers as constrained by a second layer capability for the second radio frequency carrier; summing the first maximum quantity of layers for the first radio frequency carrier and the second maximum quantity of layers for the second radio frequency carrier to provide a third maximum quantity of layers for the plurality of radio frequency carriers; and determining a final maximum quantity of layers based on the third maximum quantity of layers for the plurality of radio frequency carriers as constrained by a maximum quantity of transmit chains of the user equipment.

Aspect 13: The method of any of aspects 1 through 3 and 6, further comprising: calculating a first peak uplink data rate for the plurality of radio frequency carriers; calculating a second peak uplink data rate for another radio frequency carrier; and summing the first peak uplink data rate and the second peak uplink data rate to provide the peak uplink data rate for the time slot.

Aspect 14: The method of any of aspects 1 through 3 and 6, further comprising: calculating a first peak uplink data rate for carrier aggregation on a first radio frequency carrier of the plurality of radio frequency carriers; calculating a second peak uplink data rate for concurrent transmissions on the first radio frequency carrier and a second radio frequency carrier of the plurality of radio frequency carriers; selecting a highest peak uplink data rate for switched radio frequency carriers from the first peak uplink data rate and the second peak uplink data rate; calculating at least one third peak uplink data rate for at least one fixed uplink radio frequency carrier, wherein the user equipment does not support uplink switching between the at least one fixed uplink radio frequency carrier and any other radio frequency carrier; and summing the highest peak uplink data rate for switched radio frequency carriers and the at least one third peak uplink data rate for the at least one fixed uplink radio frequency carrier to provide the peak uplink data rate for the time slot.

Aspect 15: The method of any of aspects 1 through 3 and 6 through 14, further comprising transmitting a first indication that the user equipment supports: at least one fixed uplink radio frequency carrier; and the uplink switching between the plurality of radio frequency carriers.

Aspect 16: The method of any of aspects 1 through 15, further comprising receiving a second indication that configures the user equipment to: transmit on a single radio frequency carrier of the plurality of radio frequency carriers at a time, concurrently transmit on the plurality of radio frequency carriers, transmit on the at least one fixed uplink radio frequency carrier, or a combination thereof.

Aspect 18: The method of any of aspects 1 through 3 and 6, further comprising: calculating a first peak uplink data rate for the plurality of radio frequency carriers; calculating a second peak uplink data rate for a second plurality of radio frequency carriers; and summing the first peak uplink data rate and the second peak uplink data rate to provide the peak uplink data rate for the time slot.

Aspect 19: The method of any of aspects 1 through 3 and 6, further comprising: calculating a first peak uplink data rate for carrier aggregation on a first radio frequency carrier of the plurality of radio frequency carriers; calculating a second peak uplink data rate for concurrent transmissions on the first radio frequency carrier and a second radio frequency carrier of the plurality of radio frequency carriers; selecting a highest peak uplink data rate for a first set of switched radio frequency carriers from the first peak uplink data rate and the second peak uplink data rate; calculating a third peak uplink data rate for carrier aggregation on a third radio frequency carrier of another plurality of radio frequency carriers; calculating a fourth peak uplink data rate for concurrent transmissions on the third radio frequency carrier and a further radio frequency carrier of the other plurality of radio frequency carriers; selecting another highest peak uplink data rate for a second set of switched radio frequency carriers from the third peak uplink data rate and the fourth peak uplink data rate; and summing the highest peak uplink data rate for the first set of switched radio frequency carriers and the other highest peak uplink data rate for the second set of switched radio frequency carriers to provide the peak uplink data rate for the time slot.

Aspect 20: The method of any of aspects 1 through 19, further comprising transmitting a first indication that the user equipment supports: the uplink switching between the plurality of radio frequency carriers; and additional uplink switching between a second plurality of radio frequency carriers.

Aspect 21: The method of aspect 20, further comprising receiving a second indication that configures the user equipment to: transmit on a single radio frequency carrier of the plurality of radio frequency carriers at a time, concurrently transmit on the plurality of radio frequency carriers, transmit on a single radio frequency carrier of the second plurality of radio frequency carriers at a time, concurrently transmit on the second plurality of radio frequency carriers, or a combination thereof.

Aspect 22: The method of any of aspects 1 through 21, further comprising: receiving second scheduling information that schedules the user equipment for a second transmission at a first data rate during a second time slot; determining whether the first data rate is less than or equal to the peak uplink data rate; and selectively transmitting the second transmission according to the determining whether the first data rate is less than or equal to the peak uplink data rate.

Aspect 23: The method of aspect 22, wherein: the determining whether the first data rate is less than or equal to the peak uplink data rate comprises determining that the first data rate is greater than the peak uplink data rate; and the selectively transmitting the second transmission comprises abstaining from transmitting the second transmission.

Aspect 24: The method of aspect 22, wherein: the determining whether the first data rate is less than or equal to the peak uplink data rate comprises determining that the first data rate is less than or equal to the peak uplink data rate; and the selectively transmitting the second transmission comprises transmitting the second transmission.

Aspect 25: A method for wireless communication at a base station, the method comprising: transmitting scheduling information to a user equipment, wherein the scheduling information schedules a transmission by the user equipment on at least one radio frequency carrier of a plurality of radio frequency carriers; and receiving the transmission from the user equipment on the at least one radio frequency carrier according to a peak uplink data rate for a time slot, wherein the peak uplink data rate is based on whether the user equipment supports uplink switching between the plurality of radio frequency carriers.

Aspect 26: The method of aspect 25, further comprising: calculating the peak uplink data rate based on a maximum quantity of the plurality of radio frequency carriers on which the user equipment can transmit during the time slot.

Aspect 27: The method of any of aspects 25 through 26, wherein the plurality of radio frequency carriers correspond to a plurality of multiple-input-multiple-output (MIMO) layers.

Aspect 28: The method of any of aspects 25 through 27, further comprising: determining the maximum quantity of the plurality of radio frequency carriers based on whether the user equipment supports: an uplink transmission on a single radio frequency carrier of the plurality of radio frequency carriers at a time, concurrent uplink transmissions on the plurality of radio frequency carriers, or a combination thereof.

Aspect 29: The method of any of aspects 25 through 27, further comprising: determining the maximum quantity of the plurality of radio frequency carriers based on whether: the user equipment supports at least one fixed uplink radio frequency carrier; or the user equipment supports uplink switching between a first set of radio frequency carriers of the plurality of radio frequency carriers and between a second set of radio frequency carriers of the plurality of radio frequency carriers.

Aspect 30: A user equipment base station comprising: a transceiver configured to communicate with a radio access network, a memory, and a processor communicatively coupled to the transceiver and the memory, wherein the processor and the memory are configured to perform any one of aspects 1 through 24.

Aspect 31: An apparatus configured for wireless communication comprising at least one means for performing any one of aspects 1 through 24.

Aspect 32: A non-transitory computer-readable medium storing computer-executable code, comprising code for causing an apparatus to perform any one of aspects 1 through 24.

Aspect 33: A base station comprising: a transceiver, a memory, and a processor communicatively coupled to the transceiver and the memory, wherein the processor and the memory are configured to perform any one of aspects 25 through 29.

Aspect 34: An apparatus configured for wireless communication comprising at least one means for performing any one of aspects 25 through 29.

Aspect 35: A non-transitory computer-readable medium storing computer-executable code, comprising code for causing an apparatus to perform any one of aspects 25 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 11, 12, and 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment, comprising:

a transceiver;

one or more memories that store processor-executable code; and one or more processors configured to execute the processor-executable code and cause the user equipment to:

receive via the transceiver scheduling information for a transmission on at least one radio frequency carrier of a plurality of radio frequency carriers; and transmit the transmission via the transceiver on the at least one radio frequency carrier according to a peak uplink data rate for a time slot, wherein the peak uplink data rate is based on whether the user equipment supports uplink switching between the plurality of radio frequency carriers.

2. The user equipment of claim 1, wherein the one or more processors are further configured to execute the processor-executable code and cause the user equipment to:

calculate the peak uplink data rate based on a maximum quantity of the plurality of radio frequency carriers on which the user equipment can transmit during the time slot.

3. The user equipment of claim 2, wherein the plurality of radio frequency carriers correspond to a plurality of multiple-input-multiple-output (MIMO) layers.

4. The user equipment of claim 2, wherein the one or more processors are further configured to execute the processor-executable code and cause the user equipment to determine the maximum quantity of the plurality of radio frequency carriers based on whether the user equipment supports: an uplink transmission on a single radio frequency carrier of the plurality of radio frequency carriers at a time, concurrent uplink transmissions on the plurality of radio frequency carriers, or a combination thereof.

5. The user equipment of claim 2, wherein the one or more processors are further configured to execute the processor-executable code and cause the user equipment to:

determine the maximum quantity of the plurality of radio frequency carriers based on whether the user equipment supports at least one fixed uplink radio frequency carrier, wherein the user equipment does not support uplink switching between the at least one fixed uplink radio frequency carrier and any other radio frequency carrier.

6. The user equipment of claim 2, wherein the one or more processors are further configured to execute the processor-executable code and cause the user equipment to:

determine the maximum quantity of the plurality of radio frequency carriers based on whether the user equipment supports uplink switching between a first set of radio frequency carriers of the plurality of radio frequency carriers and between a second set of radio frequency carriers of the plurality of radio frequency carriers.

7. The user equipment of claim 1, wherein the one or more processors are further configured to execute the processor-executable code and cause the user equipment to:

determine that the user equipment supports an uplink transmission on a single radio frequency carrier of the plurality of radio frequency carriers at a time;

identify a first radio frequency carrier of the plurality of radio frequency carriers that is associated with a highest peak uplink data rate of the plurality of radio frequency carriers; and calculate the peak uplink data rate based on a quantity of layers supported by the user equipment for the first radio frequency carrier.

8. The user equipment of claim 1, wherein the one or more processors are further configured to execute the processor-executable code and cause the user equipment to:

calculate a first peak uplink data rate for carrier aggregation on a first radio frequency carrier of the plurality of radio frequency carriers;

calculate a second peak uplink data rate for concurrent transmissions on the first radio frequency carrier and a second radio frequency carrier of the plurality of radio frequency carriers; and select a highest peak uplink data rate from the first peak uplink data rate and the second peak uplink data rate to provide the peak uplink data rate for the time slot.

9. The user equipment of claim 1, wherein the one or more processors are further configured to execute the processor-executable code and cause the user equipment to:

determine a first constraint on a first maximum quantity of layers for a first radio frequency carrier of the plurality of radio frequency carriers;

determine a second constraint on a second maximum quantity of layers for a second radio frequency carrier of the plurality of radio frequency carriers;

determine a third constraint on a third maximum quantity of layers for the plurality of radio frequency carriers; and calculate the peak uplink data rate for the time slot based on the first constraint, the second constraint, and the third constraint.

10. The user equipment of claim 1, wherein the one or more processors are further configured to execute the processor-executable code and cause the user equipment to:

determine that the user equipment supports concurrent uplink transmissions on the plurality of radio frequency carriers;

determine a maximum quantity of layers supported by the user equipment for the concurrent uplink transmissions;

calculate different peak uplink data rates for different combinations of the maximum quantity of layers across the plurality of radio frequency carriers; and select a highest peak uplink data rate of the different peak uplink data rates to provide the peak uplink data rate for the time slot.

11. The user equipment of claim 10, wherein the one or more processors are further configured to execute the processor-executable code and cause the user equipment to:

determine a first maximum quantity of layers for a particular radio frequency carrier of the plurality of radio frequency carriers as constrained by a first layer capability for the particular radio frequency carrier.

12. The user equipment of claim 10, wherein the one or more processors are further configured to execute the processor-executable code and cause the user equipment to:

determine a first maximum quantity of layers for a first radio frequency carrier of the plurality of radio frequency carriers as constrained by a first layer capability for the first radio frequency carrier;

determine a second maximum quantity of layers for a second radio frequency carrier of the plurality of radio frequency carriers as constrained by a second layer capability for the second radio frequency carrier;

sum the first maximum quantity of layers for the first radio frequency carrier and the second maximum quantity of layers for the second radio frequency carrier to provide a third maximum quantity of layers for the plurality of radio frequency carriers; and determine a final maximum quantity of layers based on the third maximum quantity of layers for the plurality of radio frequency carriers as constrained by a maximum quantity of transmit chains of the user equipment.

13. The user equipment of claim 1, wherein the one or more processors are further configured to execute the processor-executable code and cause the user equipment to:

calculate a first peak uplink data rate for the plurality of radio frequency carriers;

calculate a second peak uplink data rate for another radio frequency carrier; and sum the first peak uplink data rate and the second peak uplink data rate to provide the peak uplink data rate for the time slot.

14. The user equipment of claim 1, wherein the one or more processors are further configured to execute the processor-executable code and cause the user equipment to:

calculate a first peak uplink data rate for carrier aggregation on a first radio frequency carrier of the plurality of radio frequency carriers;

calculate a second peak uplink data rate for concurrent transmissions on the first radio frequency carrier and a second radio frequency carrier of the plurality of radio frequency carriers;

select a highest peak uplink data rate for switched radio frequency carriers from the first peak uplink data rate and the second peak uplink data rate;

calculate at least one third peak uplink data rate for at least one fixed uplink radio frequency carrier, wherein the user equipment does not support uplink switching between the at least one fixed uplink radio frequency carrier and any other radio frequency carrier; and sum the highest peak uplink data rate for switched radio frequency carriers and the at least one third peak uplink data rate for the at least one fixed uplink radio frequency carrier to provide the peak uplink data rate for the time slot.

15. The user equipment of claim 1, wherein the one or more processors are further configured to execute the processor-executable code and cause the user equipment to transmit a first indication that the user equipment supports:

at least one fixed uplink radio frequency carrier; and the uplink switching between the plurality of radio frequency carriers.

16. The user equipment of claim 15, wherein the one or more processors are further configured to execute the processor-executable code and cause the user equipment to receive a second indication that configures the user equipment to:

transmit on a single radio frequency carrier of the plurality of radio frequency carriers at a time, concurrently transmit on the plurality of radio frequency carriers, transmit on the at least one fixed uplink radio frequency carrier, or a combination thereof.

17. A method of wireless communication at a user equipment, the method comprising:

receiving scheduling information for a transmission on at least one radio frequency carrier of a plurality of radio frequency carriers; and transmitting the transmission on the at least one radio frequency carrier according to a peak uplink data rate for a time slot, wherein the peak uplink data rate is based on whether the user equipment supports uplink switching between the plurality of radio frequency carriers.

18. The method of claim 17, further comprising:

calculating a first peak uplink data rate for the plurality of radio frequency carriers;

calculating a second peak uplink data rate for a second plurality of radio frequency carriers; and summing the first peak uplink data rate and the second peak uplink data rate to provide the peak uplink data rate for the time slot.

19. The method of claim 17, further comprising:

calculating a first peak uplink data rate for carrier aggregation on a first radio frequency carrier of the plurality of radio frequency carriers;

calculating a second peak uplink data rate for concurrent transmissions on the first radio frequency carrier and a second radio frequency carrier of the plurality of radio frequency carriers;

selecting a highest peak uplink data rate for a first set of switched radio frequency carriers from the first peak uplink data rate and the second peak uplink data rate;

calculating a third peak uplink data rate for carrier aggregation on a third radio frequency carrier of another plurality of radio frequency carriers;

calculating a fourth peak uplink data rate for concurrent transmissions on the third radio frequency carrier and a further radio frequency carrier of the other plurality of radio frequency carriers;

selecting another highest peak uplink data rate for a second set of switched radio frequency carriers from the third peak uplink data rate and the fourth peak uplink data rate; and summing the highest peak uplink data rate for the first set of switched radio frequency carriers and the other highest peak uplink data rate for the second set of switched radio frequency carriers to provide the peak uplink data rate for the time slot.

20. The method of claim 17, further comprising transmitting a first indication that the user equipment supports:

the uplink switching between the plurality of radio frequency carriers; and additional uplink switching between a second plurality of radio frequency carriers.

21. The method of claim 20, further comprising receiving a second indication that configures the user equipment to:

transmit on a single radio frequency carrier of the plurality of radio frequency carriers at a time, concurrently transmit on the plurality of radio frequency carriers, transmit on a single radio frequency carrier of the second plurality of radio frequency carriers at a time, concurrently transmit on the second plurality of radio frequency carriers, or a combination thereof.

22. The method of claim 17, further comprising:

receiving second scheduling information that schedules the user equipment for a second transmission at a first data rate during a second time slot;

determining whether the first data rate is less than or equal to the peak uplink data rate; and selectively transmitting the second transmission according to the determining whether the first data rate is less than or equal to the peak uplink data rate.

23. The method of claim 22, wherein:

the determining whether the first data rate is less than or equal to the peak uplink data rate comprises determining that the first data rate is greater than the peak uplink data rate; and the selectively transmitting the second transmission comprises abstaining from transmitting the second transmission.

24. The method of claim 22, wherein:

the determining whether the first data rate is less than or equal to the peak uplink data rate comprises determining that the first data rate is less than or equal to the peak uplink data rate; and the selectively transmitting the second transmission comprises transmitting the second transmission.

25. A network entity, comprising:

a transceiver;

one or more memories that store processor-executable code; and one or more processors configured to execute the processor-executable code and cause the network entity to:

transmit scheduling information to a user equipment via the transceiver, wherein the scheduling information schedules a transmission by the user equipment on at least one radio frequency carrier of a plurality of radio frequency carriers; and receive the transmission from the user equipment via the transceiver on the at least one radio frequency carrier according to a peak uplink data rate for a time slot, wherein the peak uplink data rate is based on whether the user equipment supports uplink switching between the plurality of radio frequency carriers.

26. The network entity of claim 25, wherein the one or more processors are further configured to execute the processor-executable code and cause the network entity to:

calculate the peak uplink data rate based on a maximum quantity of the plurality of radio frequency carriers on which the user equipment can transmit during the time slot.

27. The network entity of claim 26, wherein the plurality of radio frequency carriers correspond to a plurality of multiple-input-multiple-output (MIMO) layers.

28. The network entity of claim 26, wherein the one or more processors are further configured to execute the processor-executable code and cause the network entity to determine the maximum quantity of the plurality of radio frequency carriers based on whether the user equipment supports: an uplink transmission on a single radio frequency carrier of the plurality of radio frequency carriers at a time, concurrent uplink transmissions on the plurality of radio frequency carriers, or a combination thereof.

29. The network entity of claim 26, wherein the one or more processors are further configured to execute the processor-executable code and cause the network entity to determine the maximum quantity of the plurality of radio frequency carriers based on whether:

the user equipment supports at least one fixed uplink radio frequency carrier; or the user equipment supports uplink switching between a first set of radio frequency carriers of the plurality of radio frequency carriers and between a second set of radio frequency carriers of the plurality of radio frequency carriers.

30. A method of wireless communication at a network entity, the method comprising:

transmitting scheduling information to a user equipment, wherein the scheduling information schedules a transmission by the user equipment on at least one radio frequency carrier of a plurality of radio frequency carriers; and receiving the transmission from the user equipment on the at least one radio frequency carrier according to a peak uplink data rate for a time slot, wherein the peak uplink data rate is based on whether the user equipment supports uplink switching between the plurality of radio frequency carriers.

* * * * *